United States Patent
Bonaci

(10) Patent No.: US 12,288,289 B2
(45) Date of Patent: Apr. 29, 2025

(54) USER-CONTEXT AWARE RENDERING DATASET SELECTION

(71) Applicant: Google LLC, Mountain View, CA (US)

(72) Inventor: Igor Bonaci, Wollerau (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/515,421

(22) Filed: Nov. 21, 2023

(65) Prior Publication Data

US 2024/0203042 A1 Jun. 20, 2024

Related U.S. Application Data

(63) Continuation of application No. 18/172,631, filed on Feb. 22, 2023, now Pat. No. 11,869,136.

(60) Provisional application No. 63/433,111, filed on Dec. 16, 2022.

(51) Int. Cl.
| | |
|---|---|
| *G06T 15/20* | (2011.01) |
| *G06F 3/04815* | (2022.01) |
| *G06T 19/00* | (2011.01) |
| *H04N 13/117* | (2018.01) |

(52) U.S. Cl.
CPC ........ *G06T 15/205* (2013.01); *G06F 3/04815* (2013.01); *G06T 19/003* (2013.01); *H04N 13/117* (2018.05)

(58) Field of Classification Search
CPC . G06T 15/205; G06T 19/003; G06F 3/04815; H04N 13/117
See application file for complete search history.

(56) References Cited

U.S. PATENT DOCUMENTS 10,319,150 B1    6/2019   Canada et al.
2021/0390761 A1* 12/2021  Kowalski .............. G06T 15/205

OTHER PUBLICATIONS

Ribeiro, L.S.F., Bui, T., Collomosse, J. and Ponti, M., 2021. Scene designer: a unified model for scene search and synthesis from sketch. In Proceedings of the IEEE/CVF International Conference on Computer Vision (pp. 2424-2433).*
Ashual, O. and Wolf, L., 2019. Specifying object attributes and relations in interactive scene generation. In Proceedings of the IEEE/CVF international conference on computer vision (pp. 4561-4569).*

(Continued)

*Primary Examiner* — Zhitong Chen
(74) *Attorney, Agent, or Firm* — DORITY & MANNING P.A.

(57) ABSTRACT

Systems and methods for generating and providing augmented virtual environments can include obtaining user data, processing the user data to determine a plurality of objects associated with the user data, and generating one or more renderings of the objects in an environment. The renderings can be generated based on a plurality of rendering datasets obtained based on the plurality of determined objects determined to available to a user. The plurality of rendering datasets can include a plurality of three-dimensional meshes and/or a plurality of neural radiance field datasets. The one or more renderings can be provided via an interactive user interface that can allow a user to view renderings of different views of the objects in the environment from different positions and view directions.

20 Claims, 17 Drawing Sheets

(56) References Cited

OTHER PUBLICATIONS

Niemeyer, M. and Geiger, A., 2021. Giraffe: Representing scenes as compositional generative neural feature fields. In Proceedings of the IEEE/CVF Conference on Computer Vision and Pattern Recognition (pp. 11453-11464).*

Carmel, D., Zwerdling, N., Guy, I., Ofek-Koifman, S., Har'El, N., Ronen, I., Uziel, E., Yogev, S. and Chernov, S., Nov. 2009. Personalized social search based on the user's social network. In Proceedings of the 18th ACM conference on Information and knowledge management (pp. 1227-1236).*

European Search Report Corresponding to Application No. EP23217309.6 on Apr. 15, 2024.

Google Research, "Giraffe: Representing Scenes as Compositional Generative Neural Feature Fields", 2021, https://m-niemeyer.github.io/project-pages/giraffe/index.html, Retrieved on Feb. 21, 2023, 5 pages.

Google Research, "Urban Radiance Fields", 2022, https://urban-radiance-fields.github.io/, Retrieved on Feb. 21, 2023, 3 pages.

Google Research, "D-NeRF: Neural Radiance Fields for Dynamic Scenes", 2020, https://www.albertpumarola.com/research/D-NeRF/index.html, Retrieved on Feb. 21, 2023, 9 pages.

Google Research, "Sharf: Shape-conditioned Radiance Fields from a Single View", 2021, http://www.krematas.com/sharf/, Retrieved on Feb. 21, 2023, 4 pages.

Mildenhall et al., "NeRF: Representing Scenes as Neural Radiance Fields for View Synthesis", arXiv:2003.08934v2, Aug. 3, 2020, 25 pages.

Ribeiro et al., "Scene Designer: A Unified Model for Scene Search and Synthesis from Sketch", arXiv:2108.07353v1, Aug. 16, 2021, 10 pages.

Ashual et al., "Specifying Object Attributes and Relations in Interactive Scene Generation", arXiv:1909.05379v2, Nov. 17, 2019, 12 pages.

Niemeyer et al., "Giraffe: Representing Scenes as Compositional Generative Neural Feature Fields", arXiv:2011.12100v2, Apr. 29, 2021, 12 pages.

Carmel et al., "Personalized Social Search Based on the User's Social Network", In Proceedings of the 18th ACM Conference on Information and Knowledge Management, Nov. 2-6, 2009, Hong Kong, China, pp. 1227-1236.

* cited by examiner

USER-CONTEXT AWARE RENDERING DATASET SELECTION

RELATED APPLICATIONS

This application is a continuation of U.S. Non-Provisional patent application Ser. No. 18/172,631, filed Feb. 22, 2023, which claims priority to and the benefit of U.S. Provisional Patent Application No. 63/433,111, filed Dec. 16, 2022. U.S. Provisional Patent Application No. 63/433,111 and U.S. Non-Provisional patent application Ser. No. 18/172,631 are hereby incorporated by reference in its entirety.

FIELD

The present disclosure relates generally to generating and providing augmented virtual environments. More particularly, the present disclosure relates to obtaining user data, determining one or more objects associated with the user data, and generating one or more renderings that depict the one or more objects in an environment in which the selected objects are objects determined to be available to a user.

BACKGROUND

Search results responsive to a search query can include objects of interest to a user; however, the search results may include objects that are not available to a user and/or may not provide accurate visual representations of the object. For example, the images of the objects associated with the search results may not provide an analogous representation to a user's environment. Additionally, the search results that are not available to the user may be surfaced, which can cause confusion and frustration for the users.

In decorating a room, customizing a motor vehicle, building a personal computer, and/or landscaping a yard, a user may be able to determine the size layout of the environment based on manual measurements; however, viewing the composite appearance of the environment may be reliant on tedious photo manipulation for each view. The composite generation can be difficult due to lack of access to images in a certain pose, difficulty in properly scaling, and difficulty in uniform lighting. The complementary appearance of objects may be desired by a user, and such complications can cause a user to purchase items, determine items do not match, and return one or more of the items based on the uncomplimentary nature.

SUMMARY

Aspects and advantages of embodiments of the present disclosure will be set forth in part in the following description, or can be learned from the description, or can be learned through practice of the embodiments.

One example aspect of the present disclosure is directed to a computing system for providing environment suggestions. The system can include one or more processors and one or more non-transitory computer-readable media that collectively store instructions that, when executed by the one or more processors, cause the computing system to perform operations. The operations can include obtaining user data. The user data can be associated with a particular user. The user data can include context data descriptive of context information associated with the particular user. The operations can include determining a plurality of objects associated with the user data. The plurality of objects can include a plurality of products associated with one or more product types. The operations can include obtaining a plurality of rendering datasets based on the plurality of objects and the context data. Each object of the plurality of objects can be associated with one or more rendering datasets of the plurality of rendering datasets. The operations can include generating a virtual environment based on the plurality of rendering datasets. The virtual environment can be descriptive of the plurality of objects in an example environment. The operations can include providing the virtual environment for display in an interactive user interface. The interactive user interface can be configured to provide a plurality of different views of the virtual environment.

In some implementations, providing the virtual environment for display in the interactive user interface can include generating a first view rendering based on one or more of the plurality of rendering datasets. The first view rendering can include a first image descriptive of at least a first portion of the virtual environment from a first position and a first direction. Providing the virtual environment for display in the interactive user interface can include providing the first view rendering for display. Providing the virtual environment for display in the interactive user interface further can include obtaining user interface input. The user interface input can include a navigation interaction with the interactive user interface. Providing the virtual environment for display in the interactive user interface further can include generating a second view rendering based on one or more of the plurality of rendering datasets. The second view rendering can include a second image descriptive of at least a second portion of the virtual environment from a second position and a second direction. Providing the virtual environment for display in the interactive user interface further can include providing the second view rendering for display.

In some implementations, the plurality of rendering datasets can include a plurality of meshes and a plurality of neural radiance field models. Each neural radiance field model may have been trained to generate one or more view renderings of a different respective object of the plurality of objects. The plurality of meshes can be utilized to render the plurality of objects as the particular user moves a view point and view direction in the virtual environment. The plurality of neural radiance field models can be utilized to render the plurality of objects as a view point and view direction in the virtual environment is stagnant. In some implementations, the user data can include search history data associated with one or more previous search queries associated with the particular user. The user data can include browser data. The browser data can be associated with one or more previously viewed web pages.

In some implementations, the user data can include a search query. Determining the plurality of objects associated with the user data can include determining one or more rendering datasets in a rendering asset database are associated with at least a portion of the search query. The search query can include one or more query images. Determining the plurality of objects associated with the user data can include processing the one or more query images to determine one or more depicted objects and querying the rendering asset database based on the one or more depicted objects. The user data can include data descriptive of one or more saved datasets, wherein the one or more saved datasets were stored in response to one or more previous user interactions.

Another example aspect of the present disclosure is directed to a computer-implemented method for providing an augmented-reality preview. The method can include obtaining, by a computing system including one or more processors, user data and image data. The user data can be associated with a particular user. In some implementations, the image data can be descriptive of a user environment. The method can include determining, by the computing system, a plurality of objects associated with the user data. The plurality of objects can include a plurality of products associated with one or more product types. The method can include obtaining, by the computing system, a plurality of rendering datasets based on the plurality of objects. Each object of the plurality of objects can be associated with one or more rendering datasets of the plurality of rendering datasets. The method can include generating, by the computing system, augmented image data based on the plurality of rendering datasets. The augmented image data can be descriptive of the plurality of objects in the user environment. The method can include providing, by the computing system, the augmented image data for display via an interactive user interface. The interactive user interface can be configured to provide a plurality of different views of the plurality of objects in the user environment.

In some implementations, the augmented image data can include one or more augmented images. The one or more augmented images can be generated based on a plurality of predicted color values and a plurality of predicted density values generated by one or more neural radiance field models. The plurality of objects can include a plurality of different furniture items. The plurality of different furniture items can include a particular seat associated with a first product. The plurality of different furniture items can include a particular table associated with a second product. In some implementations, the method can include obtaining a user input data associated with a particular rendering associated with a particular product of the plurality of products and adjusting the augmented image data to replace the particular rendering with a different rendering. The different rendering can be associated with a different product that differs from each of the plurality of products.

Another example aspect of the present disclosure is directed to one or more non-transitory computer-readable media that collectively store instructions that, when executed by one or more computing devices, cause the one or more computing devices to perform operations. The operations can include obtaining a search query. The operations can include processing the search query to determine one or more search results. The one or more search results can be associated with one or more particular objects. The operations can include determining the one or more search results are associated with one or more rendering datasets in a rendering asset database. The rendering asset database can include a plurality of stored rendering datasets associated with a plurality of different objects. The operations can include obtaining the one or more rendering datasets from the rendering asset database. The one or more rendering datasets can include one or more meshes and one or more neural radiance field models associated with the one or more particular objects. The operations can include obtaining image data. The image data can be generated with one or more image sensors. In some implementations, the image data can be descriptive of a user environment. The operations can include generating augmented image data based on the one or more renderings datasets. The augmented image data can be descriptive of the one or more objects in the user environment. The operations can include providing the augmented image data for display via an interactive user interface. The interactive user interface can be configured to provide a plurality of different views of the one or more objects in the user environment.

In some implementations, the operations can include obtaining user input data selecting a particular rendering associated with a particular product. The particular product can be associated with the one or more objects. The operations can include obtaining product information associated with the particular product and providing the product information for display. In some implementations, the operations can include obtaining user input data selecting a particular rendering associated with a particular product. The particular product can be associated with the one or more objects. The operations can include obtaining product link associated with the particular product and providing the product link to a user computing system.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
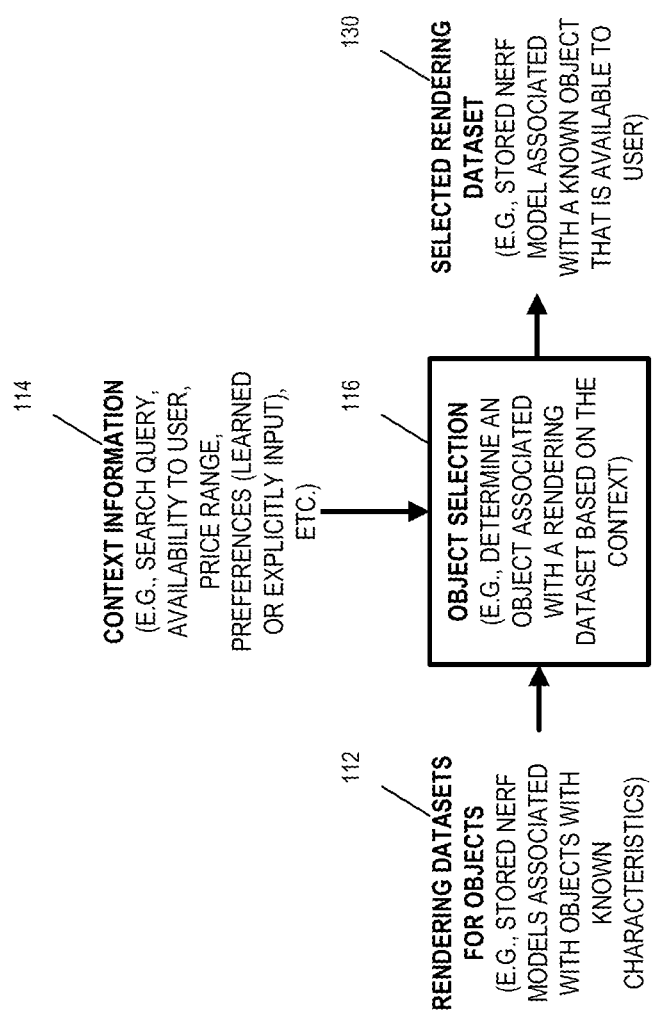
FIG. 1 depicts a block diagram of an example informed object selection system according to example embodiments of the present disclosure.

Reference numerals that are repeated across plural figures are intended to identify the same features in various implementations.

DETAILED DESCRIPTION

Generally, the present disclosure is directed to systems and methods for generating and providing augmented virtual environments based on obtained data. In particular, the systems and methods disclosed herein can determine rendering assets to obtain based on user data and can generate a virtual environment based on the obtained rendering assets. The systems and methods disclosed herein can provide a medium for users to preview one or more objects in an environment (e.g., a template room and/or a rendering of a user's room). The preview can be provided via an interactive user interface that allows users to view the augmented environment from a variety of positions and view directions (e.g., a plurality of views of a user's bedroom with a new dresser). The interactive user interface can utilize three-dimensional representations and modeling to provide a three-dimensionally aware preview, which can enable a broader selection of views with more geometrically aware renderings (e.g., a user can navigate throughout the virtual room to see how the new object will look from multiple angles). Additionally and/or alternatively, the rendering and object selection can be based on learned preferences of a user and/or based on one or more inputs. The inputs can be descriptive of a price range for an individual item or for a collection of items, which can include suggesting only objects that meet a predefined budget criteria. Two-dimensional renderings of an augmented environment can provide a snapshot of a possible view; however, a single snapshot can only provide a limited amount of information on the overall look of the suggested environment. By utilizing a three-dimensional modeling of the environment, a user can scroll through the environment to simulate a walkthrough at their own pace with their own route. Such interactivity can provide a simulation of routes a user may take in navigating a room with the one or more new objects included (e.g., a route from getting from the bedroom to the front door). The systems and methods can therefore allow users to preview what their living room may look like with one or more new candidate objects (e.g., a new sofa, a new table, and/or a new lamp).

In some implementations, the preview can be based on one or more selections of objects to render into a template environment and/or a user provided environment (e.g., a user environment generated via the processing of one or more user images). In particular, a user can add products into a shopping cart, which can then be previewed before purchase. Alternatively and/or additionally, the one or more objects may be suggested objects based on a price point, a style, a type of object, and/or an amount of space. The suggestions can be based on learned user preferences (e.g., learned preferences based on browsing history, search history, and/or purchase history), a user query, and/or one or more search parameter selections. The preview can provide a dynamic visual display that can mitigate some of the uncertainty of decorating (or furnishing) a room. Additionally and/or alternatively, the suggestion can be based on user context information. For example, the one or more objects may be selected based on an availability to a user, a price being within a price range, a size criteria, and/or based on one or more known characteristics of the object being associated with a user context.

Search results for products can be retrieved from the web; however, the search results may depict a product that is either not available to a user or out of a user's price range. Additionally, tangible products available to a user may not be provided for display in a medium that accurately depicts the product as the product would be utilized by a user.

The systems and methods disclosed herein can generate "inspirational" images using products that match user preferences (e.g., price range) and are available to a user. For example, a NERF database can be utilized to provide renderings of products available to a user in a template environment and/or the user's environment. NERF and other three-dimensional representation techniques can be utilized to generate an interactive user interface for viewing.

For example, the systems and methods can include obtaining user data (e.g., a search query, preferences, historical data, and/or user profile data). The user data can be associated with a particular user. The user data can include context data descriptive of context information for the particular user (e.g., a user location, a user price range, an amount of space available for the user to place an object, etc.). The systems and methods can include determining one or more objects associated with the user data (e.g., a plurality of objects associated with the one or more search terms of a search query). In some implementations, the one or more objects can include one or more products associated with one or more product types. The systems and methods can include obtaining one or more rendering datasets based on the one or more objects. Each object of the one or more objects can be associated with a rendering dataset of the one or more rendering datasets. The one or more objects and/or the one or more rendering datasets may be obtained and/or determined based on the context data. For example, the one or more rendering datasets may be obtained based on a determination that the object is available to the user based on accessibility and price. The selection may be based on one or more known characteristics of the object. The systems and methods can include generating a virtual environment based on the one or more rendering datasets. In some implementations, the virtual environment can be descriptive of the one or more objects in an example environment. The systems and methods can include providing the virtual environment for display in an interactive user interface. The interactive user interface can be configured to provide a plurality of different views of the virtual environment.

The systems and methods can obtain user data. The user data can be associated with a particular user. The user data can include context data descriptive of context information associated with the particular user. In some implementations, the user data can include search history data associated with one or more previous search queries associated with the particular user. The user data can include browser data. The browser data can be associated with one or more previously viewed web pages. In some implementations, the user data can include data descriptive of one or more saved datasets. The one or more saved datasets may have been stored in response to one or more previous user interactions. The user data may include user-selected data. The context data can be descriptive of a location, accessibility constraints, size constraints of rooms, a feasible price range for the user, and/or other context information.

A plurality of objects can be determined to be associated with the user data. The plurality of objects can include a plurality of products associated with one or more product types. The plurality of objects can include a plurality of different furniture items, a plurality of different clothing items, a plurality of different customization features, a plurality of different landscape items, and/or a plurality of different decorations. The plurality of objects can be obtained based on a user search history, a user browsing history, a user profile, a user photo database, a user purchase history, user location data, and/or user preference data.

In some implementations, the user data can include a search query. Determining the plurality of objects associated with the user data can include determining one or more rendering datasets in a rendering asset database are associated with at least a portion of the search query. The determination can be based on an indexed entity, an indexed link, an indexed label, and/or one or more other identifiers.

Additionally and/or alternatively, the search query can include one or more query images. Determining the plurality of objects associated with the user data further can include processing the one or more query images to determine one or more depicted objects and querying the rendering asset database based on the one or more determined objects. The determination may be based on an embedding nearest neighbor determination, feature matching, and/or label matching.

The systems and methods can obtain a plurality of rendering datasets based on the plurality of objects and/or the context data. Each object of the plurality of objects can be associated with one or more rendering datasets of the plurality of rendering datasets. In some implementations, the plurality of rendering datasets can include a plurality of meshes and a plurality of neural radiance field models. Each neural radiance field model may have been trained to generate one or more view renderings of a different respective object of the plurality of objects. The plurality of meshes can be utilized to render the plurality of objects as the particular user moves a viewpoint and view direction in the virtual environment. In some implementations, the plurality of neural radiance field models can be utilized to render the plurality of objects as a viewpoint and view direction in the virtual environment is stagnant. In some implementations, the one or more rendering datasets can be obtained based on the known characteristics associated with the one or more objects corresponding to the one or more rendering datasets being responsive (e.g., meeting and/or matching) the criteria associated with context data of the user data. For example, the one or more rendering datasets can be obtained based on the object associated with the rendering dataset being available to the user, which can include purchase accessibility (e.g., location of purchase, location of sending, and/or price range).

A virtual environment can be generated based on the plurality of rendering datasets. The virtual environment can be descriptive of the plurality of objects in an example environment. The virtual environment can be generated based on a plurality of three-dimensional representations. One or more of the three-dimensional representations may be machine-learned. The virtual environment can be associated with the anchoring of one or more rendering assets in a template three-dimensional environment. The template may be user selected, deterministically provided, determined at random, and/or determined based on historical user data.

The virtual environment can be provided for display in an interactive user interface. The interactive user interface can be configured to provide a plurality of different views of the virtual environment. The virtual environment can be provided for display via an augmented-reality experience, a virtual-reality experience, a mixed-reality experience, and/or one or more other user interface elements.

In some implementations, providing the virtual environment for display in the interactive user interface can include generating a first view rendering based on one or more of the plurality of rendering datasets. The first view rendering can include a first image descriptive of at least a first portion of the virtual environment from a first position and a first direction. Providing the virtual environment for display in the interactive user interface can include providing the first view rendering for display.

Additionally and/or alternatively, providing the virtual environment for display in the interactive user interface further can include obtaining user interface input. The user interface input can include a navigation interaction with the interactive user interface. Providing the virtual environment for display in the interactive user interface further can include generating a second view rendering based on one or more of the plurality of rendering datasets. The second view rendering can include a second image descriptive of at least a second portion of the virtual environment from a second position and a second direction. In some implementations, providing the virtual environment for display in the interactive user interface further can include providing the second view rendering for display.

Additionally and/or alternatively, the systems and methods can be utilized to generate augmented image data that depicts determined objects rendered in a user environment generated based on obtained image data. For example, the systems and methods can include obtaining user data and image data. The user data can be associated with a particular user. In some implementations, the image data can be descriptive of a user environment. The systems and methods can include determining a plurality of objects associated with the user data. The plurality of objects can include a plurality of products associated with one or more product types. The systems and methods can include obtaining a plurality of rendering datasets based on the plurality of objects. Each object of the plurality of objects can be associated with one or more rendering datasets of the plurality of rendering datasets. The systems and methods can include generating augmented image data based on the plurality of rendering datasets. In some implementations, the augmented image data can be descriptive of the plurality of objects in the user environment. The systems and methods can include providing the augmented image data for display via an interactive user interface. The interactive user interface can be configured to provide a plurality of different views of the plurality of objects in the user environment.

The systems and methods can obtain user data and image data. The user data can be associated with a particular user. The user data can be descriptive of historical data associated with the user, user input data associated with the user, and/or sensor data associated with the user. The image data can be descriptive of a user environment. For example, the user environment can be a user's bedroom, a user's living room, a user's yard, a user's car, and/or a user's office.

A plurality of objects can be determined to be associated with the user data. The plurality of objects can include a plurality of products associated with one or more product types. In some implementations, the plurality of objects can include a plurality of different furniture items. The plurality of different furniture items can include a particular seat associated with a first product. In some implementations, the plurality of different furniture items can include a particular table associated with a second product.

A plurality of rendering datasets can be obtained based on the plurality of objects. Each object of the plurality of objects can be associated with one or more rendering datasets of the plurality of rendering datasets. Each rendering dataset can include an augmented-reality rendering dataset, a virtual-reality rendering dataset, and/or another rendering dataset type. In some implementations, each rendering dataset can include one or more meshes and/or one or more neural radiance field models with one or more learned parameters associated with a learned three-dimensional representation.

Augmented image data can then be generated based on the plurality of rendering datasets. The augmented image data can be descriptive of the plurality of objects in the user environment. In some implementations, the augmented image data can include one or more augmented images. The one or more augmented images can be generated based on a plurality of predicted color values and a plurality of predicted density values generated by one or more neural radiance field models.

The augmented image data can be provided for display via an interactive user interface. The interactive user interface can be configured to provide a plurality of different views of the plurality of objects in the user environment. The interactive user interface can include an augmented-reality experience, a virtual-reality experience, and/or a mixed-reality experience. In some implementations, the interactive user interface can be configured to view one or more angles of the user environment with the objects rendered into the environment.

In some implementations, the systems and methods can obtain a user input data associated with a particular rendering associated with a particular product of the plurality of products and adjust the augmented image data to replace the particular rendering with a different rendering. The different rendering can be associated with a different product that differs from each of the plurality of products.

In some implementations, the obtained user data can include obtaining one or more search queries. The one or more search queries can be utilized to determine one or more objects to obtain and render into a user environment. For example, the systems and methods can include obtaining a search query. The systems and methods can include processing the search query to determine one or more search results. The one or more search results can be associated with one or more particular objects. The systems and methods can include determining the one or more search results are associated with one or more rendering datasets in a rendering asset database. The rendering asset database can include a plurality of stored rendering datasets associated with a plurality of different objects. In some implementations, the systems and methods can include obtaining the one or more rendering datasets from the rendering asset database. The one or more rendering datasets can include one or more meshes and one or more neural radiance field models associated with the one or more particular objects. The systems and methods can include obtaining image data. The image data can be generated with one or more image sensors. In some implementations, the image data can be descriptive of a user environment. The systems and methods can include generating augmented image data based on the one or more renderings datasets. The augmented image data can be descriptive of the one or more objects in the user environment. The systems and methods can include providing the augmented image data for display via an interactive user interface. The interactive user interface can be configured to provide a plurality of different views of the one or more objects in the user environment.

A search query can be obtained from a user. The search query can include a plurality of characters. Alternatively and/or additionally, the search query can include one or more query images. The search query can be obtained via an input received by a query input box of a user interface. The search query may be obtained via a search application and/or via a browser application.

The search query can be processed to determine one or more search results. The one or more search results can be associated with one or more particular objects. The one or more search results can be determined based on the search query, user profile data, location data, historical data, trending data, and/or preference data.

The one or more search results can be determined to be associated with one or more rendering datasets in a rendering asset database. The rendering asset database can include a plurality of stored rendering datasets associated with a plurality of different objects. Each rendering dataset can include one or more meshes, one or more three-dimensional representations, one or more machine-learned models (e.g., one or more neural radiance field models), neural radiance field data, image data, video data, and/or one or more other data files.

The one or more rendering datasets can be obtained from the rendering asset database. The one or more rendering datasets can include one or more meshes and one or more neural radiance field models associated with the one or more particular objects. The one or more meshes can be utilized as a three-dimensional visualization as the neural radiance field model processes a position and a view direction to generate a novel view rendering.

Image data can then be obtained from the user. The image data can be generated with one or more image sensors. In some implementations, the image data can be descriptive of a user environment. The image data may be obtained from a mobile computing device and may be generated via one or more image sensors of the mobile computing device. The image data can be descriptive of a user environment, which can include a bedroom, a living room, a kitchen, a bathroom, a garage, a lawn, a park, and/or another environment.

Augmented image data can be generated based on the one or more renderings datasets. The augmented image data can be descriptive of the one or more objects in the user environment. The augmented image data can be generated by processing the one or more rendering datasets and the image data with an augmentation model. The one or more rendering datasets can be utilized to generate one or more renderings of the one or more objects, and the augmentation model can augment the image data to include the one or more renderings.

The augmented image data can be provided for display via an interactive user interface. The interactive user interface can be configured to provide a plurality of different views of the one or more objects in the user environment. The interactive user interface can allow a user to change viewpoints, view directions, and scaling for the rendered environment. The user may select a portion of the environment and may move a selector to a new position to tilt the environment. Alternatively and/or additionally, a position in the environment may be selected to view the environment from that viewpoint. In some implementations, the interactive user interface can include user interface elements for adjusting the viewing experience of the augmented environment.

In some implementations, user input data selecting a particular rendering associated with a particular product can be obtained. The particular product can be associated with the one or more objects. Product information associated with the particular product can then be obtained. The product information can then be provided for display.

Alternatively and/or additionally, user input data selecting a particular rendering associated with a particular product can be obtained from the user. The particular product can be associated with the one or more objects. A product link associated with the particular product can then be obtained. The product link can then be provided to a user computing system.

In some implementations, the one or more objects can include one or more products, which may be rendered into the one or more images of the image data. The one or more products can be associated with one or more rendering datasets. The rendering datasets may be generated by one or more entities associated with the product (e.g., a manufacturer, a retailer, and/or a product owner). The one or more rendering datasets can include training one or more parameters based on one or more images of the product. The training can include adjusting one or more parameters of a neural radiance field model to generate one or more predicted color values and/or one or more density values in response to processing one or more positions and/or one or more view directions. In some implementations, the one or more learned parameters can be associated with one or more augmentation models, one or more rendering models, one or more classification models, one or more segmentation models, one or more detection models, one or more recognition models, one or more mesh models, and/or one or more prediction models. Alternatively and/or additionally, the rendering datasets may be manually configured.

The systems and methods can include providing a software development kit (SDK) and/or an application to one or more users to generate one or more rendering datasets. For example, the one or more users may be provided with an application which can receive one or more inputs to generate a rendering dataset. The rendering dataset can then be provided to a server computing system to store in a rendering database. The one or more inputs can include one or more selections in a rendering generation interface, one or more images, one or more position datasets, one or more details pulled from a web page or web database, one or more viewpoint datasets, and/or one or more inertial sensor datasets. Alternatively and/or additionally, the systems and methods can include providing a software development kit, which can be configured to enable one or more users to generate the rendering dataset in one or more applications and/or platforms.

The interactive user interface can be provided in a search application, a browser application, a map services application, a marketplace application, a discover application, and/or one or more other entry points.

Additionally and/or alternatively, the interactive user interface can include one or more options to add and remove renderings of objects to view different compositions of objects in an environment. For example, a user may provide user data that can be processed to generate a virtual environment descriptive of a living room with a first particular couch (e.g., a particular couch of a particular fabric, color, design, and/or manufacturer), a second particular couch (e.g., a particular couch of a particular fabric, color, design, and/or manufacturer), a first table (e.g., a particular table with a particular finish, particular shape, particular size, particular material, particular manufacturer, particular brand, and/or particular function), a first chair (e.g., a particular chair with a particular finish, particular shape, particular size, particular material, particular manufacturer, particular brand, and/or particular function), a second chair, a first painting (e.g., a particular decorative painting), and a first electronic device (e.g., a particular television). The systems and methods may obtain a user input to remove and/or replace one or more of the first particular couch, the second particular couch, the first table, the first chair, the second chair, the first painting, and the first electronic device. For example, a third couch, a second table, a third chair, a second painting, and/or a second electronic device may be rendered into the virtual environment in place of and/or in addition to the one or more original renderings. Alternatively and/or additionally, the interactive user interface may be configured to receive one or more inputs and augment the object rendering to include an augmented color, an augmented size, an augmented orientation, an augmented location, an augmented fabric, and/or an augmented configuration. A user may provide an additional search query to determine one or more replacement objects and/or additional objects to render into the environment.

The one or more objects may be determined based on a price range, a brand, a size, a product quality, a location, one or more learned preferences, one or more previous search queries or interactions, a material type, a retailer, an availability, and/or a particular style. The one or more objects may be determined based on a determined complimentary style with one or more other objects (e.g., one or more other determined objects, and/or one or more pre-existing objects (e.g., one or more pre-purchased objects, one or more objects indicated by a user, one or more objects in a shopping cart, one or more objects saved via one or more storage services (e.g., a wish list, saved photos, saved web pages, and/or saved notes), and/or one or more objects determined based on one or more user input images)).

The one or more objects can be rendered into the environment with a predicted size and a predicted lighting that can be based on a determined size and a determined lighting of the environment. For example, an object may be rendered, and the rendering can then be adjusted to scale the rendering to be proportional to the environment. Additionally and/or alternatively, the colors of the rendering can be adjusted based on the determined lighting to provide a more photorealistic rendering of the environment, which can account for various lighting parameters.

The systems and methods disclosed herein can include obtaining image data from a user, training a neural radiance field model on the user provided image data, and utilizing the trained neural radiance field model to generate one or more renderings of the one or more objects depicted in the image data (e.g., the one or more chairs depicted in user captured images). The neural radiance field models trained on user provided image data can be stored in one or more databases in association with a user, an entity, and/or the object. For example, a user may utilize neural radiance field models and user provided image data to learn a plurality of three-dimensional representations of user clothing to provide a virtual closet for a user to view the different clothing items with uniform posing and lighting which can aid in planning outfits. Additionally and/or alternatively, a user may be a retailer that leverages the trained neural radiance field models to provide renderings of products for users.

Three-dimensional modeling, object segmentation, and novel view rendering can be inaccessible to users. Such features can be helpful for search, visualizing rearranged environments, understanding objects, and comparing objects without having to have objects physically side by side.

The systems and methods disclosed herein can leverage the democratization of neural radiance field models (NERF) to allow users to create, store, share, and view high quality 3D content at a widespread level. This can aid in remodeling, outfit designs, object comparison, and catalog generation (e.g., merchants can build high quality 3D content for products and add to their website).

Additionally and/or alternatively, search results for products can be retrieved from the web; however, the search results may depict a product that is either not available to a user or out of a user's price range. Additionally, tangible products available to a user may not be provided for display in a medium that accurately depicts the product as the product would be utilized by a user.

The systems and methods disclosed herein can render "inspirational" images using products that match user preferences (e.g., price range) and that are available to a user. For example, a NERF database can be utilized to provide renderings of products available to a user in a template environment and/or the user's environment. NERF and other three-dimensional representation techniques can be utilized to generate an interactive user interface for viewing. Additionally and/or alternatively, the use of the datasets with known availability and characteristics stored in the NERF database can provide more accurate searching as knowledge graphs associated with the obtained rendering dataset can be utilized.

Some existing techniques in product visualization utilize augmented-reality to provide a visualization of possible environment changes; however, the augmented-reality technique can be limited to a user being in the desired location. Additionally, the rendering of a plurality of augmented-reality renderings in an environment can be computationally expensive and may cause difficulties with anchoring and scaling of the objects. Two-dimensional rendering of objects in an environment can provide a snapshot of a possible environment; however, the single snapshot may provide limited information without being three-dimensionally aware. The existing methods may additionally fail to provide size determinations and lighting corrections.

The systems and methods of the present disclosure provide a number of technical effects and benefits. As one example, the system and methods can provide an interactive user interface that can depict an environment with one or more objects. In particular, the systems and methods disclosed herein can leverage object prediction/suggestion, one or more augmentation models, and/or one or more user interface elements to provide an interactive user interface for viewing a preview of an environment with suggested objects. For example, the systems and methods can predict objects that may be associated with a user input, user preferences, and/or user historical data. The determined objects can be rendered into a template environment and/or a user environment (e.g., a user environment rendered based on one or more user input images). The interface can provide renderings that can inform a user of how the one or more objects would look together and/or in a particular environment. The interface can utilize object meshes for instantaneous renderings that can then be replaced by realistic neural radiance field-based renderings. The renderings can be geometrically-aware, lighting adjusted for the scene, and dimensionally accurate with relation to the generated environment.

Another technical benefit of the systems and methods of the present disclosure is the ability to leverage context data and rendering datasets to generate view synthesis images of objects available to the user. For example, traditional search results may surface search results that are responsive to a user query but may not be available to the user based one or more availability criterion. The systems and methods disclosed herein can process the context data and the known characteristics of the one or more objects to determine one or more objects that are available to the user. Rendering dataset(s) for the one or more determined objects can then be obtained to generate one or more view synthesis images of the available objects. Therefore, a user can view images of products actually available to them. Additionally, the user may utilize the one or more view synthesis images as a visual query that can be utilized to obtain search results that provide additional links and/or details associated with the object, which can include purchase links, object specifications, etc.

In particular, the systems and methods disclosed herein can provide a user with unique imagery with contextually relevant objects. Additionally and/or alternatively, the objects with known characteristics can be rendered into images of a user's environment and/or a template environment analogous to the user's environment. In some implementations, the visual search with the view synthesis image can be able to provide better and/or more relevant results because the query image includes known objects. For example, the visual search results may be improved based on the object in the view synthesis image being a known object with known characteristics that may be recognizable with one or more visual search techniques. In some implementations, one benefit of the systems and methods disclosed herein can include shopping results which have characteristics that implicitly meet user's preferences and/or explicitly respond to a user's search query (e.g., the shopping result is available for purchase in the user's location at their preferred price point).

Another technical benefit of the systems and methods of the present disclosure is the ability to leverage one or more machine-learned models to generate rendering datasets. For example, the systems and methods can train one or more machine-learned models to generate renderings of objects and/or environments based on training image data, training text data, training latent encoding data, training labels, and/or training mesh data. The training data may be provided by one or more users. In some implementations, a plurality of training datasets can be obtained from a plurality of users to generate a plurality of rendering datasets to be stored in a rendering database.

Another example of technical effect and benefit relates to improved computational efficiency and improvements in the functioning of a computing system. For example, the systems and methods disclosed herein can leverage mesh data to generate the renderings utilized during the movement of an environment. Once a user stops moving the environment, one or more neural radiance field models can be utilized to generate more photorealistic renderings of the object and/or environment. The utilization of mesh data can be less computationally expensive and can afford the fluid rendering of the environment as a user navigates between viewpoints and/or view directions.

With reference now to the Figures, example embodiments of the present disclosure will be discussed in further detail.

FIG. 1 depicts a block diagram of an example informed object selection system 100 according to example embodiments of the present disclosure. In particular, the informed object selection system 100 can include the selection of rendering datasets 112 associated with one or more objects based on context information 114 of a user and/or availability to the user. The informed object selection system 100 can leverage the context information 114 and/or other user data to determine rendering datasets 112 associated with objects that are available to the user to acquire (e.g., to purchase).

For example, context information 114 may be obtained from a user computing system. The context information 114 can include one or more search queries, a location of the user, a price range, other availability criteria for the user, preferences, historical data (e.g., search history data, browsing history data, and/or purchase history data), and/or user profile data. The search query may be associated with one or more objects, one or more styles, and/or one or more other details.

The context information 114 can be processed for object selection 116. The object selection 116 can include determining an object associated with a rendering dataset that is associated with the context information 114. The selected rendering dataset 130 can be a rendering dataset from a plurality of rendering datasets 112. The plurality of rendering datasets 112 can include a plurality of stored neural radiance field (NeRF) models associated with a plurality of objects with known characteristics. The plurality of rendering datasets 112 may be stored in a rendering dataset library and may be stored with metadata associated with location, price, action links (e.g., links to details on the website, links to purchase a product associated with the object, and/or tracking links), and/or additional known characteristics.

The object selection 116 can include determining a location and/or a price range associated with a user based on the context information 114 and may select a particular object based on the object being available to the user's location and/or within the user's price range. The object selection 116 may be utilized to determine search results responsive to a search query and/or may be utilized to provide suggestions to a user. In some implementations, the selected rendering dataset 130 may be utilized to generate one or more renderings that may be displayed in a search results interface and/or a suggestions interface (e.g., a discover interface). The renderings can be descriptive of the object in a user environment and/or a template environment. Therefore, the informed object selection system 100 can be utilized to provide search results and/or suggestions with a rendering dataset for live try-on experiences and/or other rendering tasks in which the rendering dataset is descriptive of an object available to a user based on location, size, and/or price range.

Figure 2:
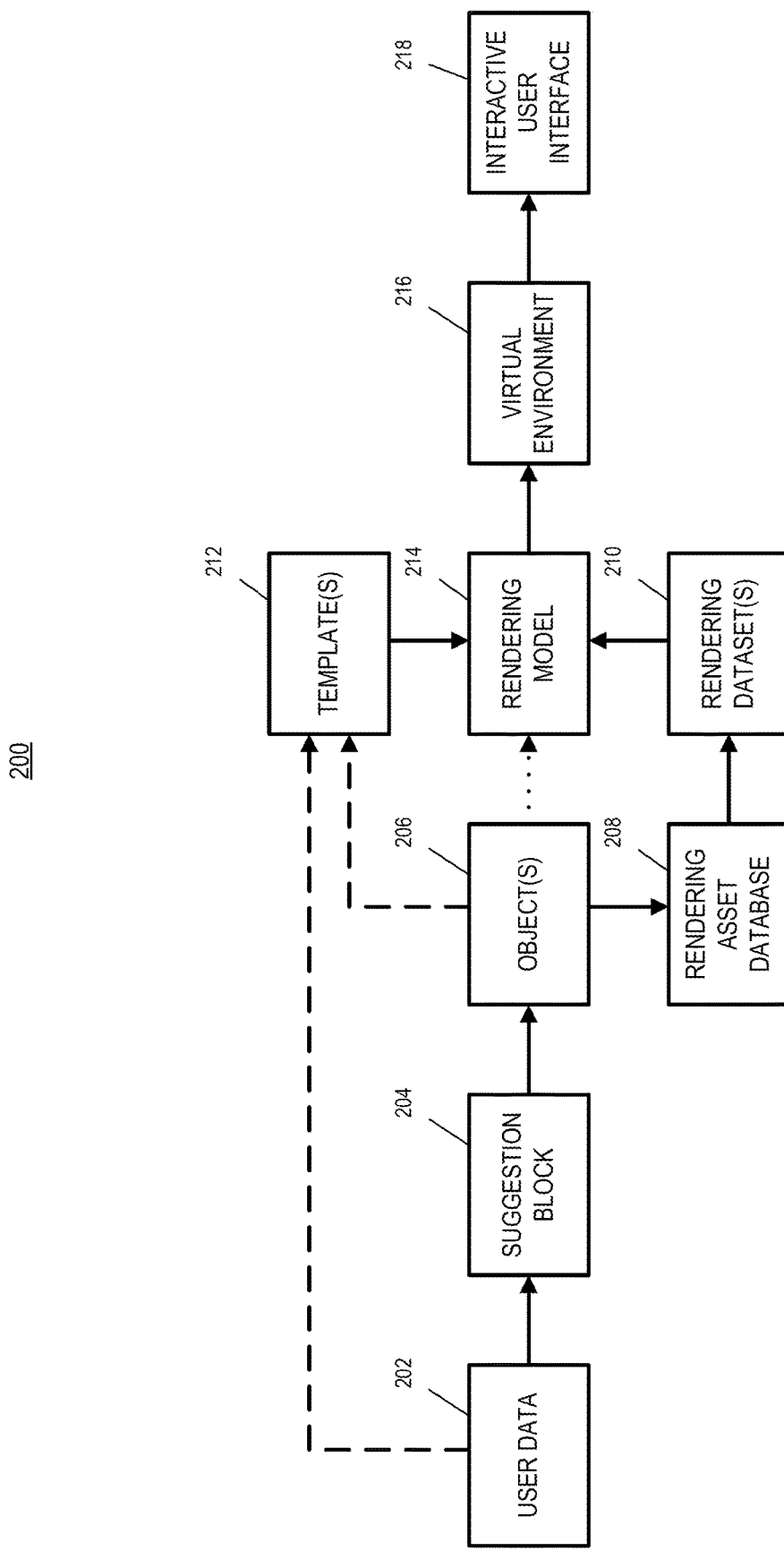
FIG. 2 depicts a block diagram of an example virtual environment generation according to example embodiments of the present disclosure.

FIG. 2 depicts a block diagram of an example virtual environment generation 200 according to example embodiments of the present disclosure. In particular, FIG. 2 depicts user data 202 being processed to generate a virtual environment 216, which can be provided for display via an interactive user interface 218.

The user data 202 can be obtained from a user computing system. The user data 202 can include a search query, historical data (e.g., search history, browsing history, purchase history, and/or interaction history), preference data, and/or user profile data. The user data 202 can be processed by a suggestion block 204 to determine one or more objects 206 associated with the user data 202. The one or more objects 206 can be associated with one or more products for purchase. One or more rendering datasets 210 can then be obtained from a rendering asset database 208 based on the one or more objects 206. The one or more rendering datasets 210 can be obtained by querying the rendering asset database 208 with data associated with the one or more objects 206. In some implementations, the one or more rendering datasets 210 can be pre-associated with the one or more objects 206 (e.g., via one or more labels).

One or more templates 212 can then be obtained. The one or more templates 212 can be associated with one or more example environments (e.g., an example room, an example lawn, and/or an example car). The one or more templates 212 may be determined based on the user data 202 and/or based on the one or more objects 206. The templates 212 can include image data, mesh data, a trained neural radiance field model, a three-dimensional representation, and/or a virtual-reality experience.

The one or more templates 212 and the one or more rendering datasets 210 can be processed with a rendering model 214 to generate a virtual environment 216. The rendering model 214 can include one or more neural radiance field models, one or more augmentation models, and/or one or more mesh models.

The virtual environment 216 can be descriptive of the one or more objects 206 rendered into the template environment. The virtual environment 216 can be generated based on the one or more templates 212 and the one or more rendering datasets 210. The virtual environment 216 may be provided for display in an interactive user interface 218. In some implementations, the user may be able to interact with interactive user interface 218 to view the virtual environment 216 from different angles and/or with different scaling.

Figure 3:
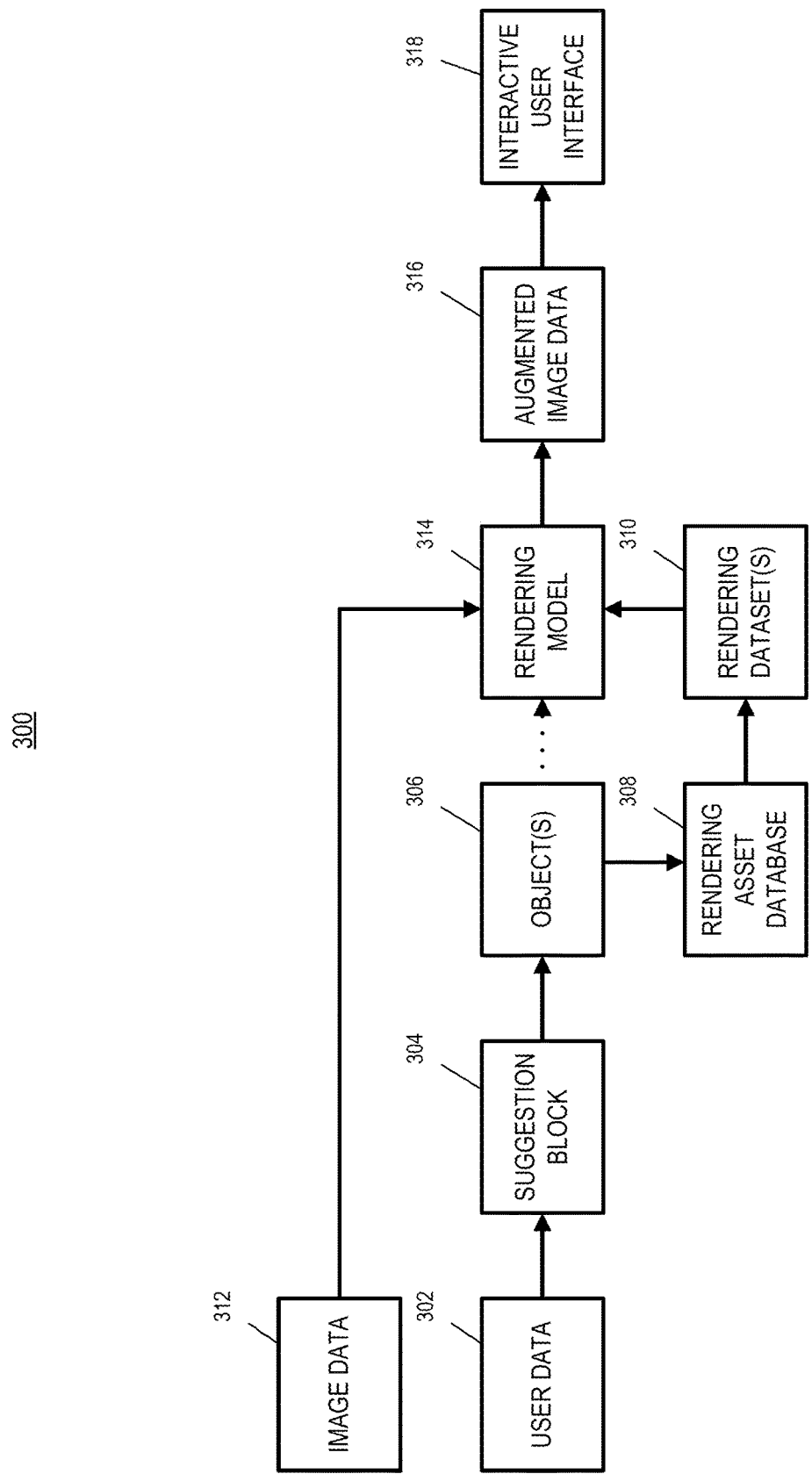
FIG. 3 depicts a block diagram of an example augmented image data generation according to example embodiments of the present disclosure.

FIG. 3 depicts a block diagram of an example augmented image data generation 300 according to example embodiments of the present disclosure. In particular, FIG. 3 depicts user data 302 and image data 312 being processed to generate augmented image data 316, which can be provided for display via an interactive user interface 318.

The user data 302 can be obtained from a user computing system. The user data 302 can include a search query, historical data (e.g., search history, browsing history, purchase history, and/or interaction history), preference data, and/or user profile data. The user data 302 can be processed by a suggestion block 304 to determine one or more objects 306 associated with the user data 302. The one or more objects 306 can be associated with one or more products for purchase. One or more rendering datasets 310 can then be obtained from a rendering asset database 308 based on the one or more objects 306. The one or more rendering datasets 310 can be obtained by querying the rendering asset database 308 with data associated with the one or more objects 306. In some implementations, the one or more rendering datasets 310 can be pre-associated with the one or more objects 306 (e.g., via one or more labels).

Image data 312 can then be obtained. The image data 312 can be associated with one or more user environments (e.g., a living room of a user, a bedroom of the user, a current environment a user is in, a lawn of the user, and/or a specific car associated with the user). The image data 312 may be obtained in response to one or more selections by a user. The image data 312 can include one or more images of the environment. In some implementations, the image data 312 can be utilized to train one or more machine-learned models (e.g., one or more neural radiance field models).

The image data 312 and the one or more rendering datasets 310 can be processed with a rendering model 314 to generate augmented image data 316. The rendering model 314 can include one or more neural radiance field models, one or more augmentation models, and/or one or more mesh models.

The augmented image data 316 can be descriptive of the one or more objects 306 rendered into the user environment. The augmented image data 316 can be generated based on the image data 312 and the one or more rendering datasets 310. The augmented image data 316 may be provided for display in an interactive user interface 318. In some implementations, the user may be able to interact with interactive user interface 318 to view one or more various renderings of the augmented image data 316 descriptive of different angles and/or different scaling for the augmented user environment.

Figure 4:
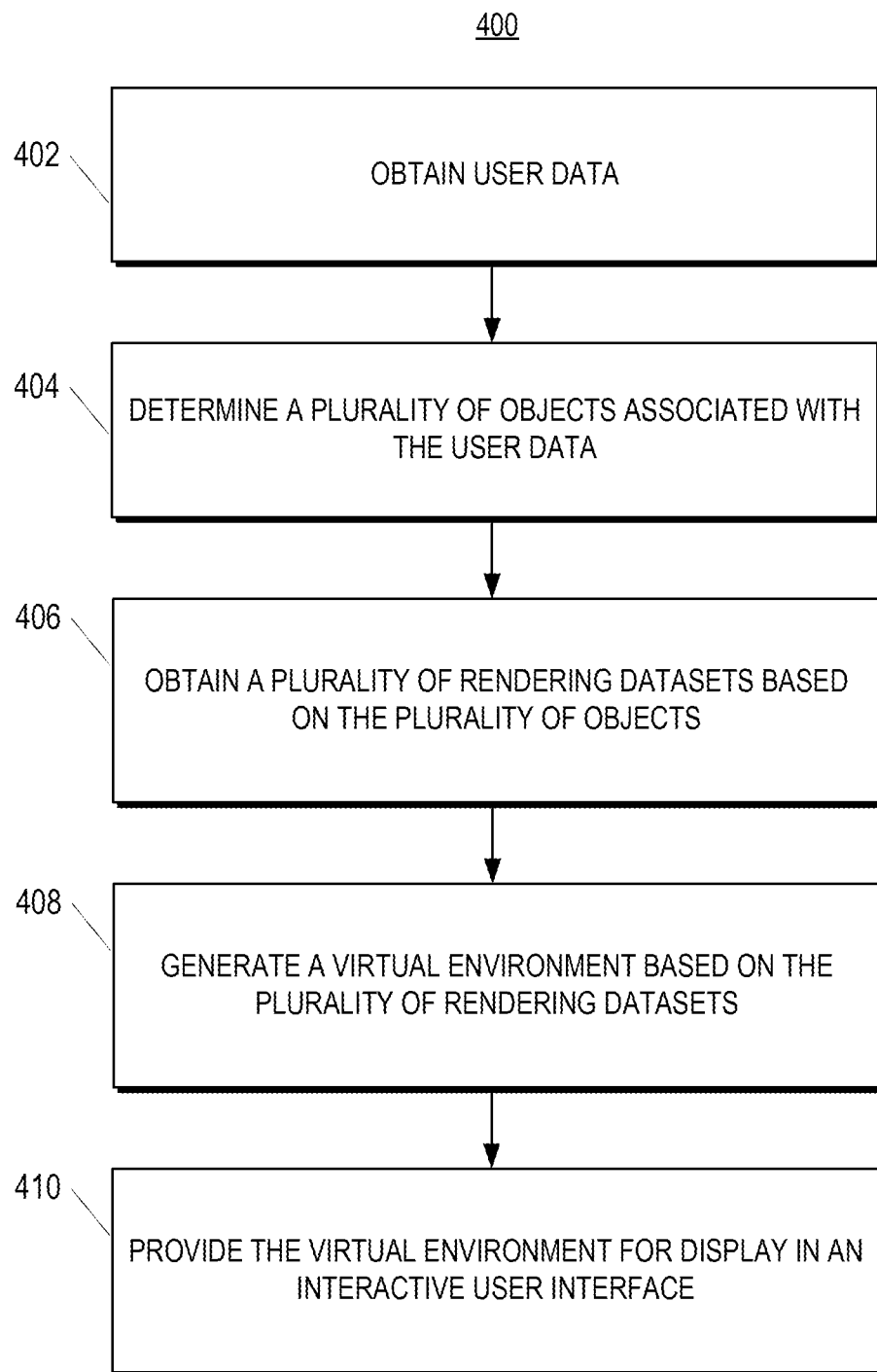
FIG. 4 depicts a flow chart diagram of an example method to perform virtual environment generation according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can obtain user data. The user data can be associated with a particular user. In some implementations, the user data can include search history data associated with one or more previous search queries associated with the particular user. The user data can include browser data. The browser data can be associated with one or more previously viewed web pages. In some implementations, the user data can include data descriptive of one or more saved datasets. The one or more saved datasets may have been stored in response to one or more previous user interactions. The user data can include context data descriptive of context information associated with the particular user.

At 404, the computing system can determine a plurality of objects associated with the user data. The plurality of objects can include a plurality of products associated with one or more product types. The plurality of objects can include a plurality of different furniture items, a plurality of different clothing items, a plurality of different customization features, a plurality of different landscape items, and/or a plurality of different decorations. The plurality of objects can be obtained based on a user search history, a user browsing history, a user profile, a user photo database, a user purchase history, user location data, and/or user preference data.

In some implementations, the user data can include a search query. Determining the plurality of objects associated with the user data can include determining one or more rendering datasets in a rendering asset database are associated with at least a portion of the search query. The determination can be based on an indexed entity, an indexed link, an indexed label, and/or one or more other identifiers.

Additionally and/or alternatively, the search query can include one or more query images. Determining the plurality of objects associated with the user data further can include processing the one or more query images to determine one or more depicted objects and querying the rendering asset database based on the one or more determined objects. The determination may be based on an embedding nearest neighbor determination, feature matching, and/or label matching.

At 406, the computing system can obtain a plurality of rendering datasets based on the plurality of objects. In some implementations, the plurality of rendering datasets can be obtained based on the context data (e.g., obtaining datasets associated with objects that meet an availability criterion, a price criterion, and/or a size criteria). Each object of the plurality of objects can be associated with one or more rendering datasets of the plurality of rendering datasets. In some implementations, the plurality of rendering datasets can include a plurality of meshes and a plurality of neural radiance field models. Each neural radiance field model may have been trained to generate one or more view renderings of a different respective object of the plurality of objects. The plurality of meshes can be utilized to render the plurality of objects as the particular user moves a viewpoint and view direction in the virtual environment. In some implementations, the plurality of neural radiance field models can be utilized to render the plurality of objects as a viewpoint and view direction in the virtual environment is stagnant.

At 408, the computing system can generate a virtual environment based on the plurality of rendering datasets. The virtual environment can be descriptive of the plurality of objects in an example environment. The virtual environment can be generated based on a plurality of three-dimensional representations. One or more of the three-dimensional representations may be machine-learned. The virtual environment can be associated with the anchoring of one or more rendering assets in a template three-dimensional environment. The template may be user selected, deterministically provided, determined at random, and/or determined based on historical user data.

At 410, the computing system can provide the virtual environment for display in an interactive user interface. The interactive user interface can be configured to provide a plurality of different views of the virtual environment. The virtual environment can be provided for display via an augmented-reality experience, a virtual-reality experience, a mixed-reality experience, and/or one or more other user interface elements.

In some implementations, providing the virtual environment for display in the interactive user interface can include generating a first view rendering based on one or more of the plurality of rendering datasets. The first view rendering can include a first image descriptive of at least a first portion of the virtual environment from a first position and a first direction. Providing the virtual environment for display in the interactive user interface can include providing the first view rendering for display.

Additionally and/or alternatively, providing the virtual environment for display in the interactive user interface further can include obtaining user interface input. The user interface input can include a navigation interaction with the interactive user interface. Providing the virtual environment for display in the interactive user interface further can include generating a second view rendering based on one or more of the plurality of rendering datasets. The second view rendering can include a second image descriptive of at least a second portion of the virtual environment from a second position and a second direction. In some implementations, providing the virtual environment for display in the interactive user interface further can include providing the second view rendering for display.

Figure 5:
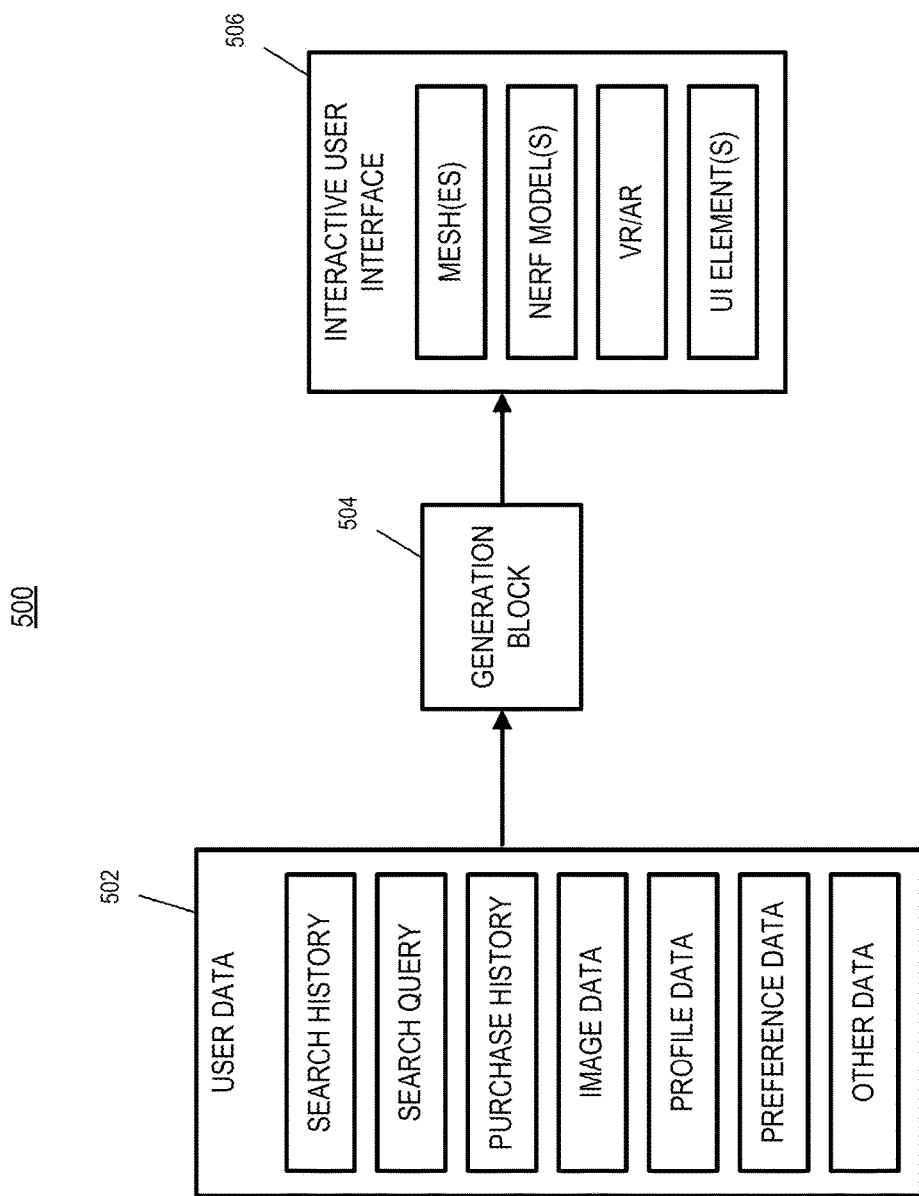
FIG. 5 depicts a block diagram of an example user data processing system according to example embodiments of the present disclosure.

FIG. 5 depicts a block diagram of an example user data processing system 500 according to example embodiments of the present disclosure. In particular, FIG. 5 depicts processing user data 502 with a generation block 504 to generate a virtual environment to be provided via an interactive user interface 506.

The user data 502 can include search history data (e.g., previously input search queries by a particular user and/or a group of users, previously selected search results, and/or previously input search parameters), one or more search queries (e.g., one or more search terms, one or more query images, and/or one or more audio queries), purchase history data (e.g., previously purchased products, products previously put in a user's shopping cart, and/or wish list objects), image data (e.g., one or more images of an environment and/or one or more images of one or more objects), profile data (e.g., data associated with one or more profiles that are associated with one or more users), preference data (e.g., one or more preferences manually input and/or inferred based on one or more user interactions), and/or other data.

The user data 502 can be processed by a generation block 504 that can include one or more rendering blocks (e.g., one or more neural radiance field models), one or more segmentation models, one or more object detection models, one or more object recognition models, one or more natural language processing models, one or more augmentation models, and/or one or more semantic understanding models.

The interactive user interface 506 can leverage the one or more virtual environments generated by the generation block 504 to provide an interactive experience for viewing a suggested augmented environment. The interactive user interface 506 may utilize one or more meshes and/or one or more neural radiance field models to generate one or more view renderings of the one or more objects in the environment. Alternatively and/or additionally, the interactive user interface 506 can utilize an augmented-reality experience and/or a virtual-reality experience to provide the virtual environment for display. For example, a three-dimensional representation of the environment with the objects rendered can be provided for display via augmented-reality and/or virtual-reality.

Additionally and/or alternatively, the interactive user interface 506 can utilize one or more user interface elements to provide information for display and/or to receive inputs. For example, the user interface elements may provide more information on one or more objects automatically and/or based on one or more selections. The one or more user interface elements can be utilized to navigate the virtual environment to view one or more different angles and/or positions of the virtual environment. Additionally and/or alternatively, the user interface elements can enable a user to scale the virtual environment to view the virtual environment at different sizes. In some implementations, the one or more user interface elements can be utilized to reposition one or more objects in the environment, remove one or more objects, add one or more objects, and/or replace one or more objects.

Figure 6:
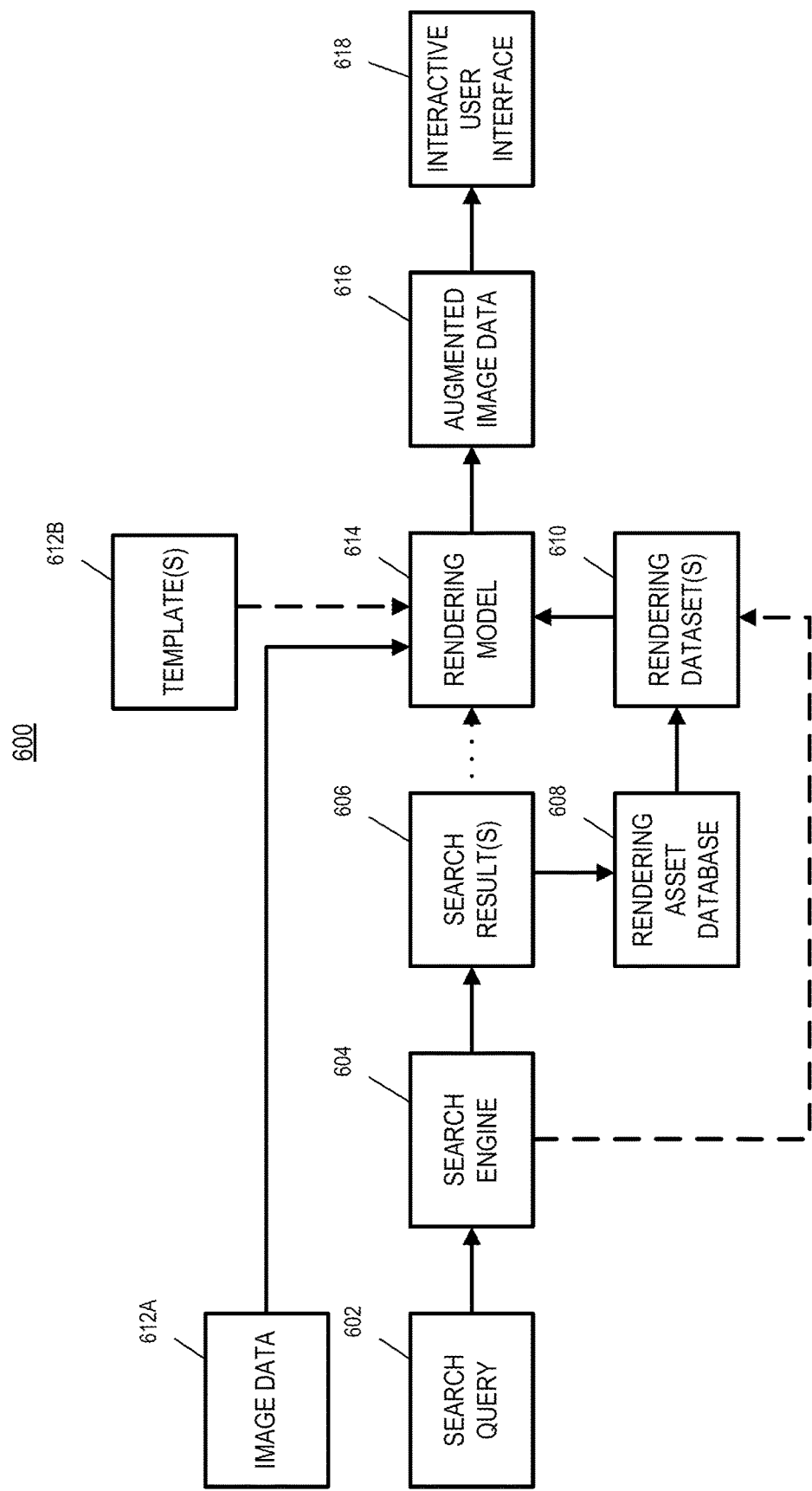
FIG. 6 depicts a block diagram of an example search query processing system according to example embodiments of the present disclosure.

FIG. 6 depicts a block diagram of an example search query processing system 600 according to example embodiments of the present disclosure. In particular, FIG. 6 depicts a search query 602 and/or image data 612 being processed to generate augmented image data 616, which can be provided for display via an interactive user interface 618.

The search query 602 can be obtained from a user computing system. The search query 602 can include one or more characters (e.g., one or more words), image data (e.g., one or more images of an object, one or more images of a style, and/or a video), audio data (e.g., speech data), and/or gesture data. The search query 602 can be processed by a search engine 604 to determine one or more search results 606 associated with the search query 602 (e.g., one or more objects responsive to the search query 602). The one or more search results 606 can be associated with one or more products for purchase. The one or more search results 606 can be descriptive of one or more objects responsive to the search query 602. The one or more objects can include products for purchase. For example, the search query 602 can be descriptive of a price range, a style, a type of environment, types of products, and/or one or more qualities. The one or more search results 606 can then be one or more products that are responsive to the descriptive features of the search query 602. One or more rendering datasets 610 can then be obtained from a rendering asset database 608 based on the one or more search results 606. The one or more rendering datasets 610 can be obtained by querying the rendering asset database 608 with data associated with the one or more search results 606 and/or the search query 602. In some implementations, the one or more rendering datasets 610 can be pre-associated with the one or more objects associated with the one or more search results 606 (e.g., via one or more labels).

Image data 612A can then be obtained. The image data 612A can be associated with one or more user environments (e.g., a living room of a user, a bedroom of the user, a current environment a user is in, a lawn of the user, and/or a specific car associated with the user). The image data 612A may be obtained in response to one or more selections by a user. The image data 612A can include one or more images of the environment. In some implementations, the image data 612A can be utilized to train one or more machine-learned models (e.g., one or more neural radiance field models).

Alternatively and/or additionally, one or more templates 612B can be obtained. The one or more templates 612B can be associated with one or more example environments (e.g., an example room, an example lawn, and/or an example car). The one or more templates 612B may be determined based on the search query 602 and/or based on the one or more search results 606. The templates 612B can include image data, mesh data, a trained neural radiance field model, a three-dimensional representation, and/or a virtual-reality experience.

The image data 612A, the one or more templates 612B, and/or the one or more rendering datasets 610 can be processed with a rendering model 614 to generate augmented image data 616. The rendering model 614 can include one or more neural radiance field models, one or more augmentation models, and/or one or more mesh models.

The augmented image data 616 can be descriptive of one or more objects associated with the one or more search results 606 rendered into the user environment. The augmented image data 616 can be generated based on the image data 612A, the one or more templates 612B, and/or the one or more rendering datasets 610. The augmented image data 616 may be provided for display in an interactive user interface 618. In some implementations, the user may be able to interact with interactive user interface 618 to view one or more various renderings of the augmented image data 616 descriptive of different angles and/or different scaling for the augmented user environment and/or augmented template environment.

Figure 7:
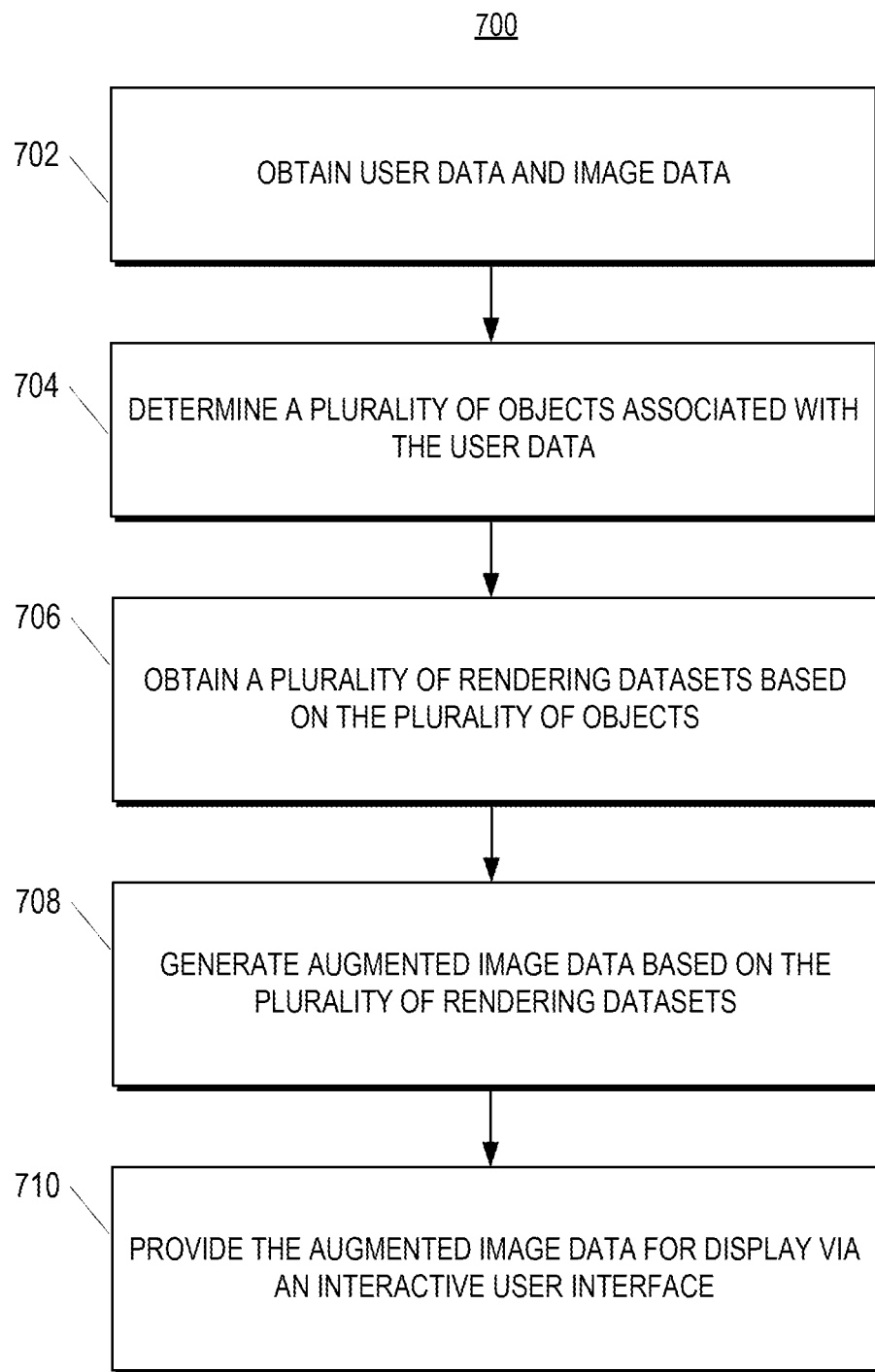
FIG. 7 depicts a flow chart diagram of an example method to perform augmented image data generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain user data and image data. The user data can be associated with a particular user. The user data can be descriptive of historical data associated with the user, user input data associated with the user, and/or sensor data associated with the user. The image data can be descriptive of a user environment. For example, the user environment can be a user's bedroom, a user's living room, a user's yard, a user's car, and/or a user's office.

At 704, the computing system can determine a plurality of objects associated with the user data. The plurality of objects can include a plurality of products associated with one or more product types. In some implementations, the plurality of objects can include a plurality of different furniture items. The plurality of different furniture items can include a particular seat associated with a first product. In some implementations, the plurality of different furniture items can include a particular table associated with a second product.

At 706, the computing system can obtain a plurality of rendering datasets based on the plurality of objects. Each object of the plurality of objects can be associated with one or more rendering datasets of the plurality of rendering datasets. Each rendering dataset can include an augmented-reality rendering dataset, a virtual-reality rendering dataset, and/or another rendering dataset type. In some implementations, each rendering dataset can include one or more meshes and/or one or more neural radiance field models with one or more learned parameters associated with a learned three-dimensional representation.

At 708, the computing system can generate augmented image data based on the plurality of rendering datasets. The augmented image data can be descriptive of the plurality of objects in the user environment. In some implementations, the augmented image data can include one or more augmented images. The one or more augmented images can be generated based on a plurality of predicted color values and a plurality of predicted density values generated by one or more neural radiance field models.

At 710, the computing system can provide the augmented image data for display via an interactive user interface. The interactive user interface can be configured to provide a plurality of different views of the plurality of objects in the user environment. The interactive user interface can include an augmented-reality experience, a virtual-reality experience, and/or a mixed-reality experience. In some implementations, the interactive user interface can be configured to view one or more angles of the user environment with the objects rendered into the environment.

In some implementations, the computing system can obtain a user input data associated with a particular rendering associated with a particular product of the plurality of products and adjust the augmented image data to replace the particular rendering with a different rendering. The different rendering can be associated with a different product that differs from each of the plurality of products.

Figure 8:
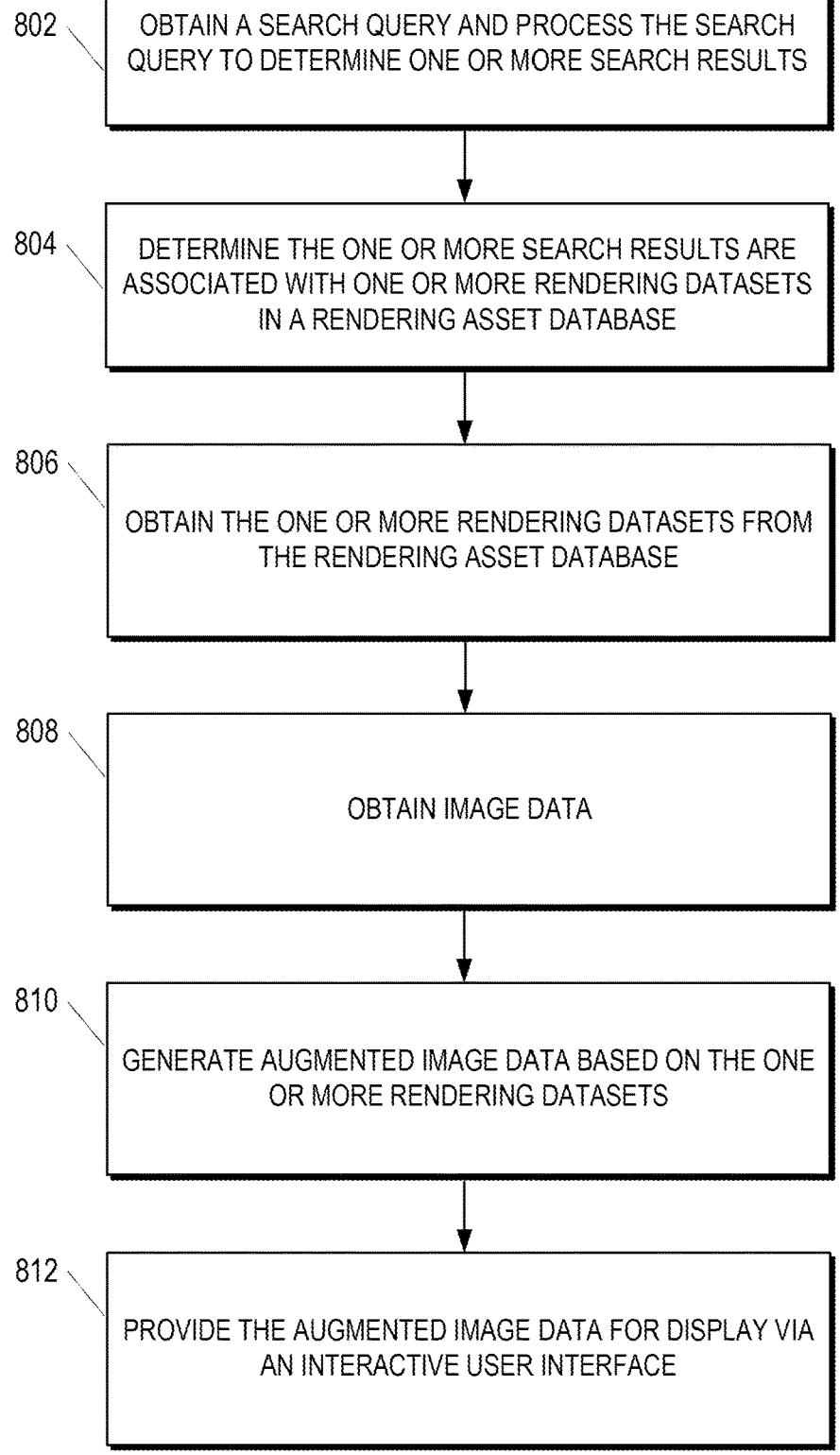
FIG. 8 depicts a flow chart diagram of an example method to perform search query processing according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a search query and process the search query to determine one or more search results. The search query can include a plurality of characters. Alternatively and/or additionally, the search query can include one or more query images. The search query can be obtained via an input received by a query input box of a user interface. The search query may be obtained via a search application and/or via a browser application.

The one or more search results can be associated with one or more particular objects. The one or more search results can be determined based on the search query, user profile data, location data, historical data, trending data, and/or preference data.

At 804, the computing system can determine the one or more search results are associated with one or more rendering datasets in a rendering asset database. The rendering asset database can include a plurality of stored rendering datasets associated with a plurality of different objects. Each rendering dataset can include one or more meshes, one or more three-dimensional representations, one or more machine-learned models (e.g., one or more neural radiance field models), neural radiance field data, image data, video data, and/or one or more other data files.

At 806, the computing system can obtain the one or more rendering datasets from the rendering asset database. The one or more rendering datasets can include one or more meshes and one or more neural radiance field models associated with the one or more particular objects. The one or more meshes can be utilized as a three-dimensional visualization as the neural radiance field model processes a position and a view direction to generate a novel view rendering.

At 808, the computing system can obtain image data. The image data can be generated with one or more image sensors. In some implementations, the image data can be descriptive of a user environment. The image data may be obtained from a mobile computing device and may be generated via one or more image sensors of the mobile computing device. The image data can be descriptive of a user environment, which can include a bedroom, a living room, a kitchen, a bathroom, a garage, a lawn, a park, and/or another environment.

At 810, the computing system can generate augmented image data based on the one or more rendering datasets. The augmented image data can be descriptive of the one or more objects in the user environment. The augmented image data can be generated by processing the one or more rendering datasets and the image data with an augmentation model. The one or more rendering datasets can be utilized to generate one or more renderings of the one or more objects, and the augmentation model can augment the image data to include the one or more renderings.

At 812, the computing system can provide the augmented image data for display via an interactive user interface. The interactive user interface can be configured to provide a plurality of different views of the one or more objects in the user environment. The interactive user interface can allow a user to change viewpoints, view directions, and scaling for the rendered environment. The user may select a portion of the environment and may move a selector to a new position to tilt the environment. Alternatively and/or additionally, a position in the environment may be selected to view the environment from that viewpoint. In some implementations, the interactive user interface can include user interface elements for adjusting the viewing experience of the augmented environment.

In some implementations, user input data selecting a particular rendering associated with a particular product can be obtained. The particular product can be associated with the one or more objects. Product information associated with the particular product can then be obtained. The product information can then be provided for display.

Alternatively and/or additionally, user input data selecting a particular rendering associated with a particular product can be obtained from the user. The particular product can be associated with the one or more objects. A product link associated with the particular product can then be obtained. The product link can then be provided to a user computing system.

Figure 9:
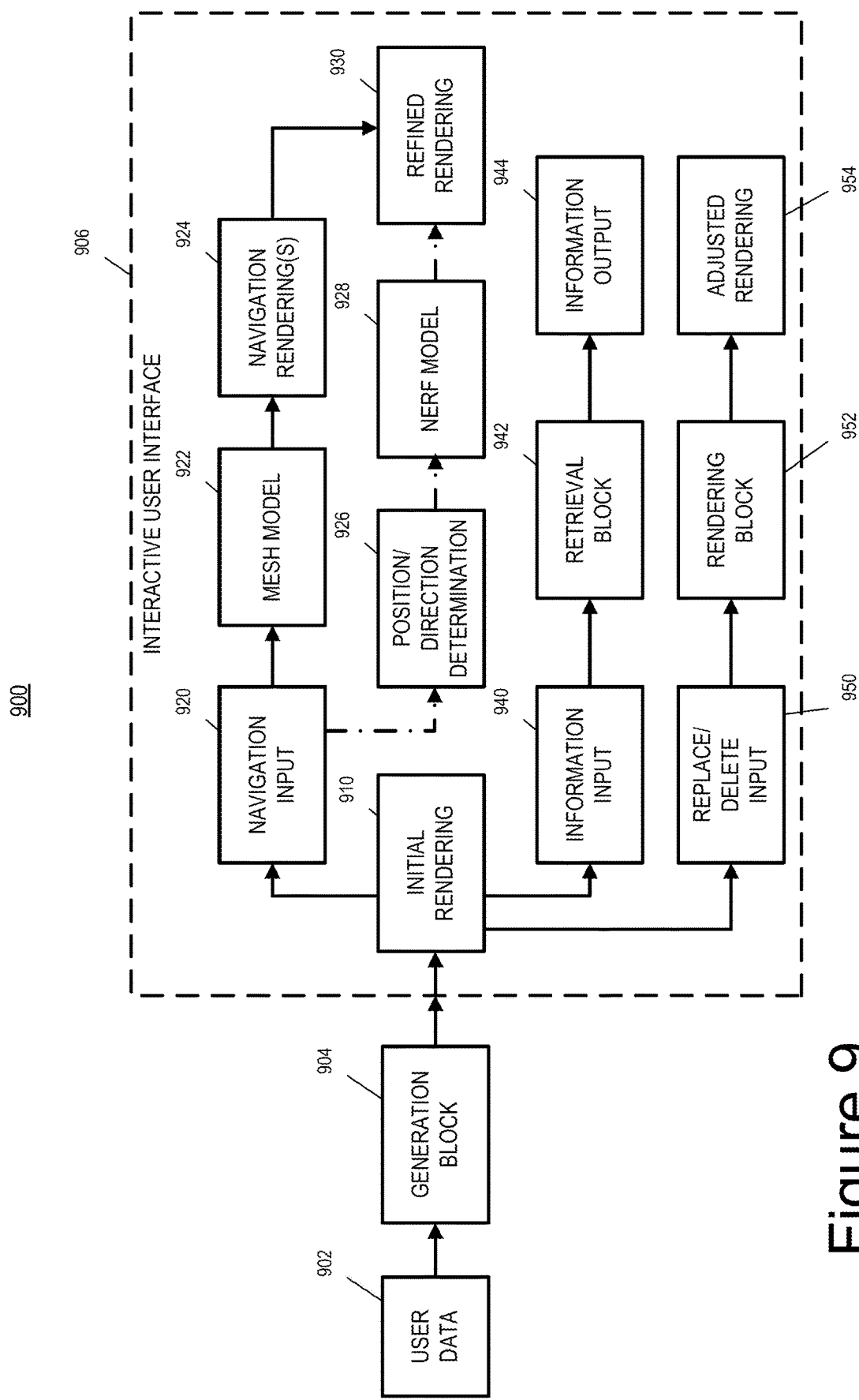
FIG. 9 depicts a block diagram of an example rendering flow system according to example embodiments of the present disclosure.

FIG. 9 depicts a block diagram of an example rendering flow system 900 according to example embodiments of the present disclosure. Similarly to FIG. 5, FIG. 9 depicts processing user data 902 with a generation block 904 to generate a virtual environment, which can be provided for display via an interactive user interface 906. Additionally, FIG. 9 depicts displaying an initial rendering 910 of the virtual environment. The initial rendering 910 can be generated based on processing a position and a view direction with one or more neural radiance field models to generate a view rendering. Alternatively and/or additionally, the initial rendering 910 can be generated by augmenting one or more images to include one or more objects.

A user may further interact with the virtual environment by providing one or more additional inputs. For example, a user may provide a navigation input 920. The navigation input 920 may be descriptive of one or more inputs to navigate throughout the virtual environment to view the virtual environment from a different angle and/or a different position. In some implementations, the interactive user interface 906 can utilize a movement pipeline as the display transitions from a first position and/or first view direction to a second position and/or a second view direction, and the interactive user interface 906 may utilize a stagnant pipeline for the view positions and view directions that are displayed for at least a threshold period of time.

The movement pipeline can include processing the navigation input 920 with a mesh model 922 to generate one or more navigation renderings 924 to be displayed as the display transitions from the first position and/or the first view direction to the second position and/or the second view direction. The mesh model 922 can utilize one or more three-dimensional meshes to render the shapes and/or colors of the objects and/or the environment.

The stagnant pipeline can process the navigation input 920 with a position/direction determination block 926 to determine a final position and final view direction associated with the navigation input 920. The determined position and determined view direction can be processed by one or more neural radiance field models 928 to generate a refined rendering 930. The refined rendering 930 may replace one or more navigation renderings 924. Additionally and/or alternatively, one or more navigation renderings may be provided for display immediately preceding the display of the refined rendering 930.

Alternatively and/or additionally, the one or more additional inputs can include an information input 940. For example, an information input 940 can be obtained that may be descriptive of a request to obtain more information about a particular object and/or a plurality of objects. A retrieval block 942 (e.g., a search engine and/or a semantic understanding model) may process the information input 940 to generate an information output 944. The information output 944 can include additional information about one or more objects, which can include a price (or price ranges), a style, a material, color options, weight, size, time of shipping, other options, entities associated with the object, name of the object, website associated with the object, a retailer, and/or a description. The information output 944 may then be provided for display via one or more user interface elements (e.g., a pop-up window, an information overlay, an audio notification, a separate window, etc.).

In some implementations, the additional input can include a replace/delete input 950. The replace/delete input 950 can be descriptive of replacing and/or removing one or more object renderings. The replace/delete input 950 can be processed and one or more user interface elements may be provided to provide the user with one or more options for completing the replacement or removal. For example, one or more alternative options for other objects in the specific object class that can be utilized to replace the selected object can be provided for display. The other objects can be in the same price range, of same material, of same color, and/or may differ in one or more aspects. The replace/delete input 950 may then be processed by the rendering block 950 to generate an adjusted rendering 954. The adjusted rendering 954 can be descriptive of the virtual environment with the one or more selected objects replaced and/or deleted.

Figure 10:
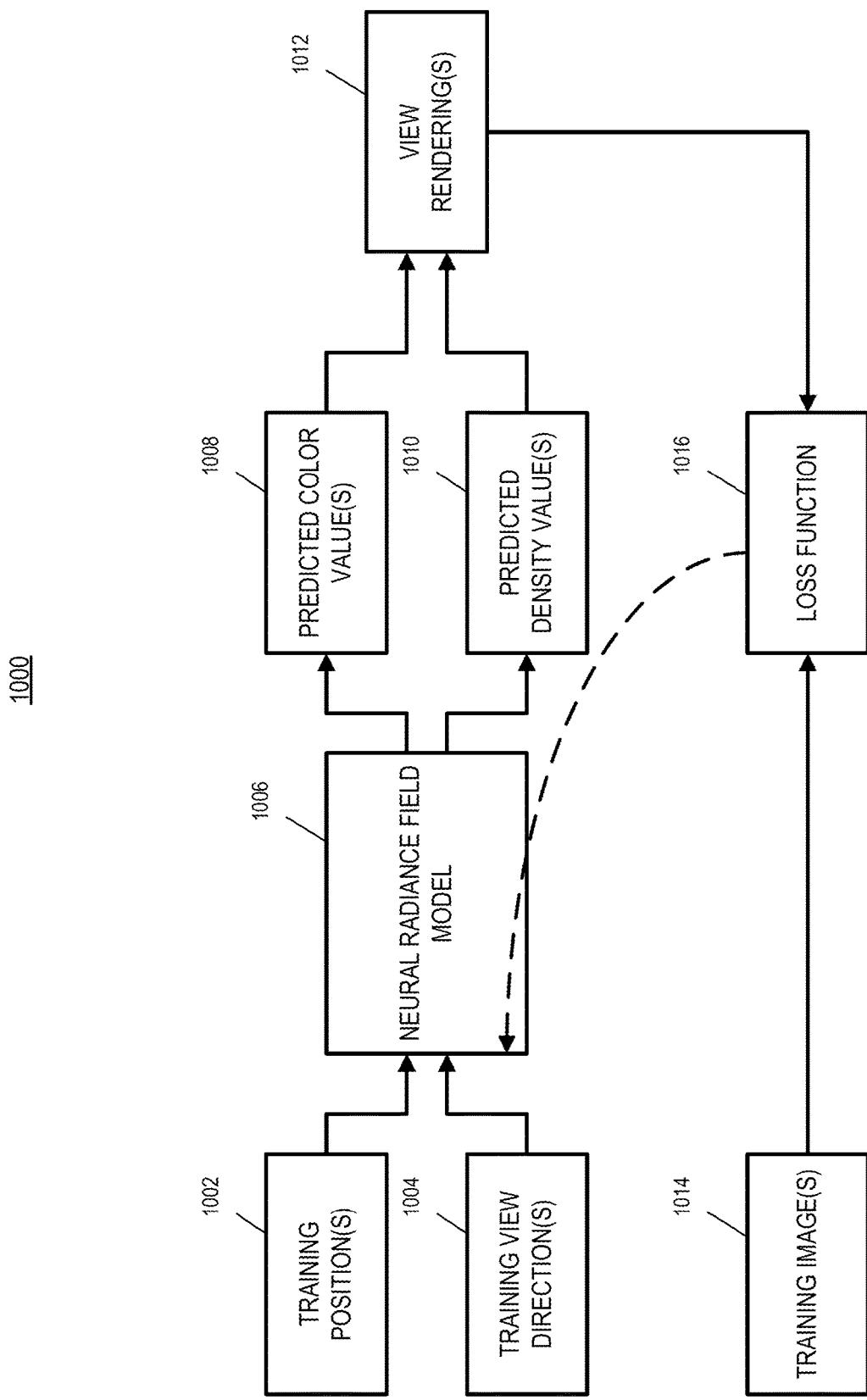
FIG. 10 depicts a block diagram of an example neural radiance field model training according to example embodiments of the present disclosure.

FIG. 10 depicts a block diagram of an example neural radiance field model training 1000 according to example embodiments of the present disclosure. Training the neural radiance field model 1006 can include processing one or more training datasets. The one or more training datasets can be specific to one or more objects and/or one or more environments. For example, a neural radiance field model 1006 can process a training position 1002 (e.g., a three-dimensional position) and a training view direction 1004 (e.g., a two-dimensional view direction and/or a vector) to generate one or more predicted color values 1008 and/or one or more predicted density values 1010. The one or more predicted color values 1008 and the one or more predicted density values 1010 can be utilized to generate a view rendering 1012.

A training image 1014 associated with the training position 1002 and training view direction 1004 can be obtained. The training image 1014 and the view rendering 1012 can be utilized to evaluate a loss function 1016. The evaluation can then be utilized to adjust one or more parameters of the neural radiance field model 1006. For example, the training image 1014 and the view rendering 1012 can be utilized to evaluate the loss function 1016 to generate a gradient descent, which can be backpropagated to adjust the one or more parameters. The loss function 1016 can include an L2 loss function, a perceptual loss function, a mean-squared loss function, a cross-entropy loss function, and/or a hinge loss function.

Figure 11:
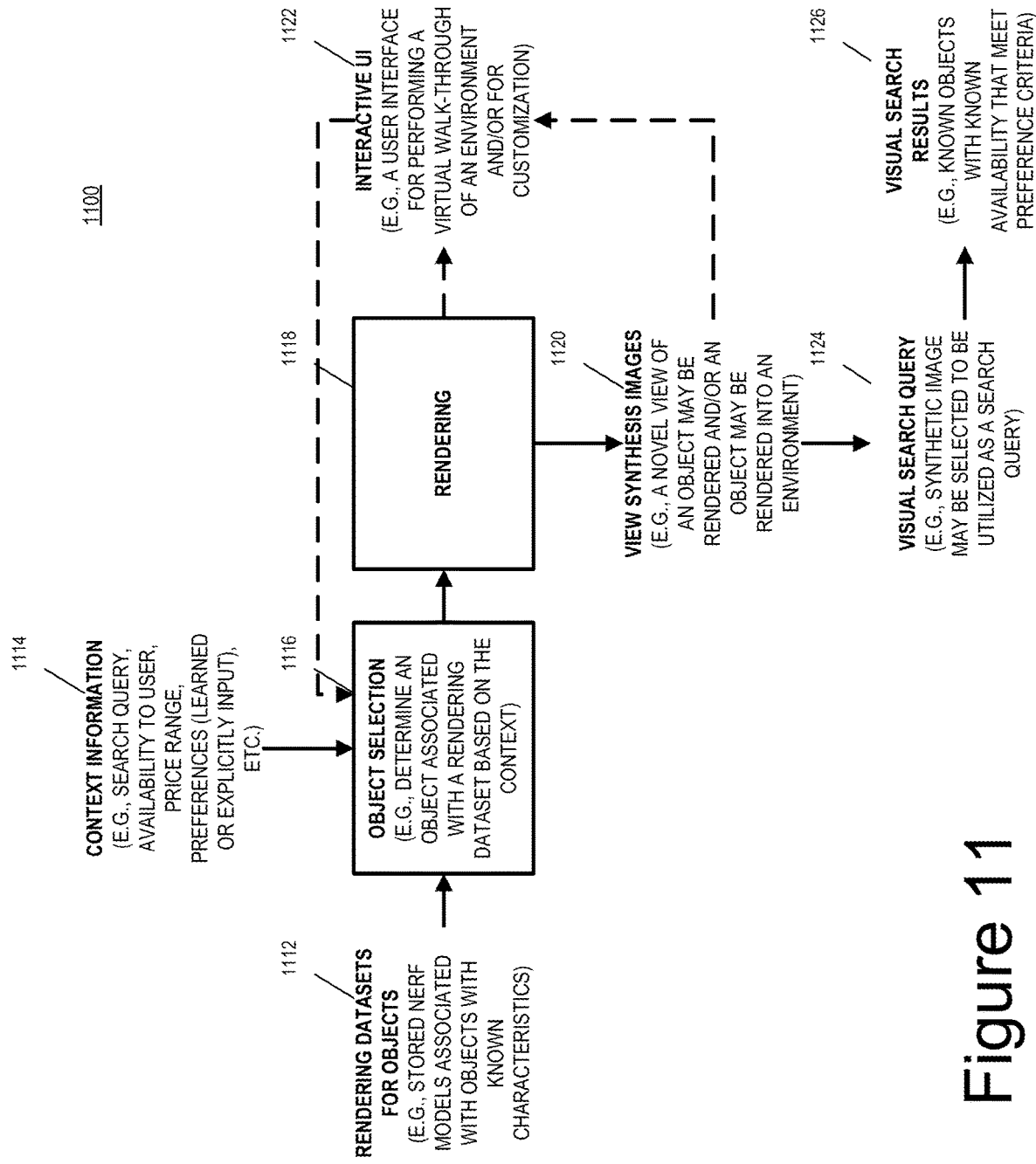
FIG. 11 depicts a block diagram of an example informed object selection and rendering system according to example embodiments of the present disclosure.

FIG. 11 depicts a block diagram of an example informed object selection and rendering system 1100 according to example embodiments of the present disclosure. In particular, the informed object selection and rendering system 1100 can include the selection of rendering datasets 1112 associated with one or more objects based on context information 1114 of a user and/or availability to the user. The informed object selection system 1100 can leverage the context information 1114 and/or other user data to determine rendering datasets 1112 associated with objects that are available to the user to acquire (e.g., to purchase).

For example, context information 1114 may be obtained from a user computing system. The context information 1114 can include one or more search queries, a location of the user, a price range, other availability criteria for the user, preferences, historical data (e.g., search history data, browsing history data, and/or purchase history data), and/or user profile data. The search query may be associated with one or more objects, one or more styles, and/or one or more other details.

The context information 1114 can be processed for object selection 1116. The object selection 1116 can include determining an object associated with a rendering dataset that is associated with the context information 1114. The selected rendering dataset can be a rendering dataset from a plurality of rendering datasets 1112. The plurality of rendering datasets 1112 can include a plurality of stored neural radiance field (NeRF) models associated with a plurality of objects with known characteristics. The plurality of rendering datasets 1112 may be stored in a rendering dataset library and may be stored with metadata associated with location, price, action links (e.g., links to details on the website, links to purchase a product associated with the object, and/or tracking links), and/or additional known characteristics.

The object selection 1116 can include determining a location and/or a price range associated with a user based on the context information 1114 and may select a particular object based on the object being available to the user's location and/or within the user's price range. The object selection 1116 may be utilized to determine search results responsive to a search query and/or may be utilized to provide suggestions to a user. In some implementations, the selected rendering dataset 1130 may be utilized to generate one or more renderings that may be displayed in a search results interface and/or a suggestions interface (e.g., a discover interface). The renderings can be descriptive of the object in a user environment and/or a template environment. Therefore, the informed object selection and rendering system 1100 can be utilized to provide search results and/or suggestions with a rendering dataset for live try-on experiences and/or other rendering tasks in which the rendering dataset is descriptive of an object available to a user based on location, size, and/or price range.

For example, the selected rendering dataset can be processed with a rendering block 1118 to generate one or more view synthesis images 1120. The one or more view synthesis images 1120 can be provided for display via an interactive user interface 1122. The one or more view synthesis images 1120 can be descriptive of a novel view of an object may be rendered and/or an object may be rendered into an environment (e.g., a user environment and/or a template environment). The interactive user interface 1122 may utilize the selected rendering dataset and the rendering block 1118 to generate and/or provide a virtual walkthrough of an environment with the object rendered into the environment. For example, the interactive user interface 1122 may allow a user to navigate through a rendered environment with the object, which can include generating updated view renderings in response to one or more navigation selections.

Additionally and/or alternatively, the interactive user interface 1122 can include one or more customization options that can be utilized to obtain and utilize additional rendering datasets, which can include an updated selection and/or an additional selection to view multiple rendered objects at once. In some implementations, the rendered environment can include one or more rendering datasets associated with the user, which can include trained neural radiance field models trained on user image data. The customization can include moving objects, replacing objects, adding objects, and/or removing objects.

In some implementations, the one or more view synthesis images 1120 and/or data associated with the selected rendering dataset may be utilized as a visual search query 1124 to obtain one or more visual search results 1126. The one or more visual search results 1126 can be associated with known objects with known availability that meet one or more preference criteria. The one or more visual search results 1126 may be pre-associated with the selected rendering dataset. Alternatively and/or additionally, the one or more visual search results 1126 may be based on a visual similarity with the one or more view synthesis images 1120. In some implementations, the search engine may process the one or more view synthesis images 1120 and the context information 1114 to determine the one or more visual search results 1126.

The visual search query 1124 may include a particular view synthesis image, may include a cropped portion of a view synthesis image, and/or one or more training images associated with the selected rendering dataset. For example, the visual search query 1124 may include a segmented portion of a particular view synthesis image. A user may select the object in the one or more view synthesis images 1120 to segment the object from the image to then be utilized as a visual search query 1124.

Figure 12:
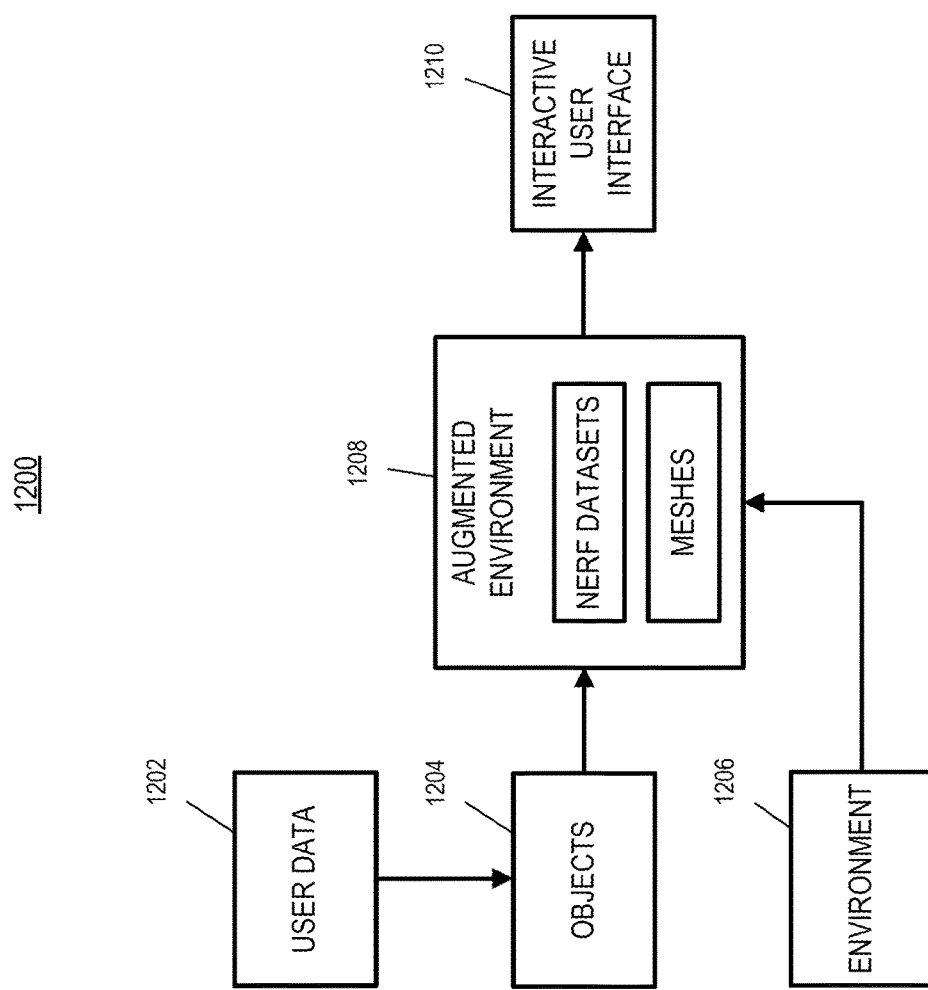
FIG. 12 depicts a block diagram of an example augmented environment generation system according to example embodiments of the present disclosure.

FIG. 12 depicts a block diagram of an example augmented environment generation system 1200 according to example embodiments of the present disclosure. The augmented environment generation system 1200. In particular, FIG. 12 depicts an augmented environment generation system 1200 that includes obtaining user data 1202 (e.g., a search query, search parameters, preference data, historical user data, and/or image data) and outputting an interactive user interface 1210 to a user that is descriptive of a three-dimensional representation of an augmented environment 1208 that includes a plurality of objects 1204 rendered into an environment 1206.

For example, user data 1202 associated with a user can be obtained. The user data 1202 can include a search query (e.g., one or more key words and/or one or more query images), historical data (e.g., a user's search history, a user's browser history, and/or a user's purchase history), preference data (e.g., explicitly input preferences, learned preferences, and/or a weighted adjustment of preferences), refinement parameters (e.g., a price range, a location, a brand, a rating, and/or a size), and/or a generated collection (e.g., a collection generated by the user, which can include a shopping cart and/or a virtual interest board).

The user data 1202 can be utilized to determine one or more objects 1204. The one or more objects 1204 can be responsive to the user data 1202. For example, the one or more objects 1204 can be associated with search results responsive to a search query and/or one or more refinement parameters. In some implementations, the one or more objects 1204 can be determined by processing the user data 1202 with one or more machine-learned models trained to suggest objects.

The one or more rendering datasets associated with the one or more objects 1204 can be obtained to augment and environment 1206 to generate an augmented environment 1208 that can be provided in an interactive user interface 1210. The one or more rendering datasets can include one or more meshes and one or more neural radiance field datasets (e.g., one or more neural radiance field models with one or more learned parameters associated with the object) for each particular object.

The augmented environment 1208 can be provided as meshes rendered in an environment 1206 during instances of environment navigation and can be provided with neural radiance field renderings in the environment 1206 during instances of a threshold time being obtained during viewing of the augmented environment 1208 from a particular position and view direction.

The navigation and stagnation can occur in response to interactions with the interactive user interface 1210. The interactive user interface 1210 can include pop-up elements for providing additional information on the one or more objects 1204 and/or may be utilized to replace/add/delete objects 1204.

The environment 1206 can be a template environment and/or may be a user environment generated based on one or more user inputs (e.g., virtual model generation and/or one or more input images).

Figure 13A:
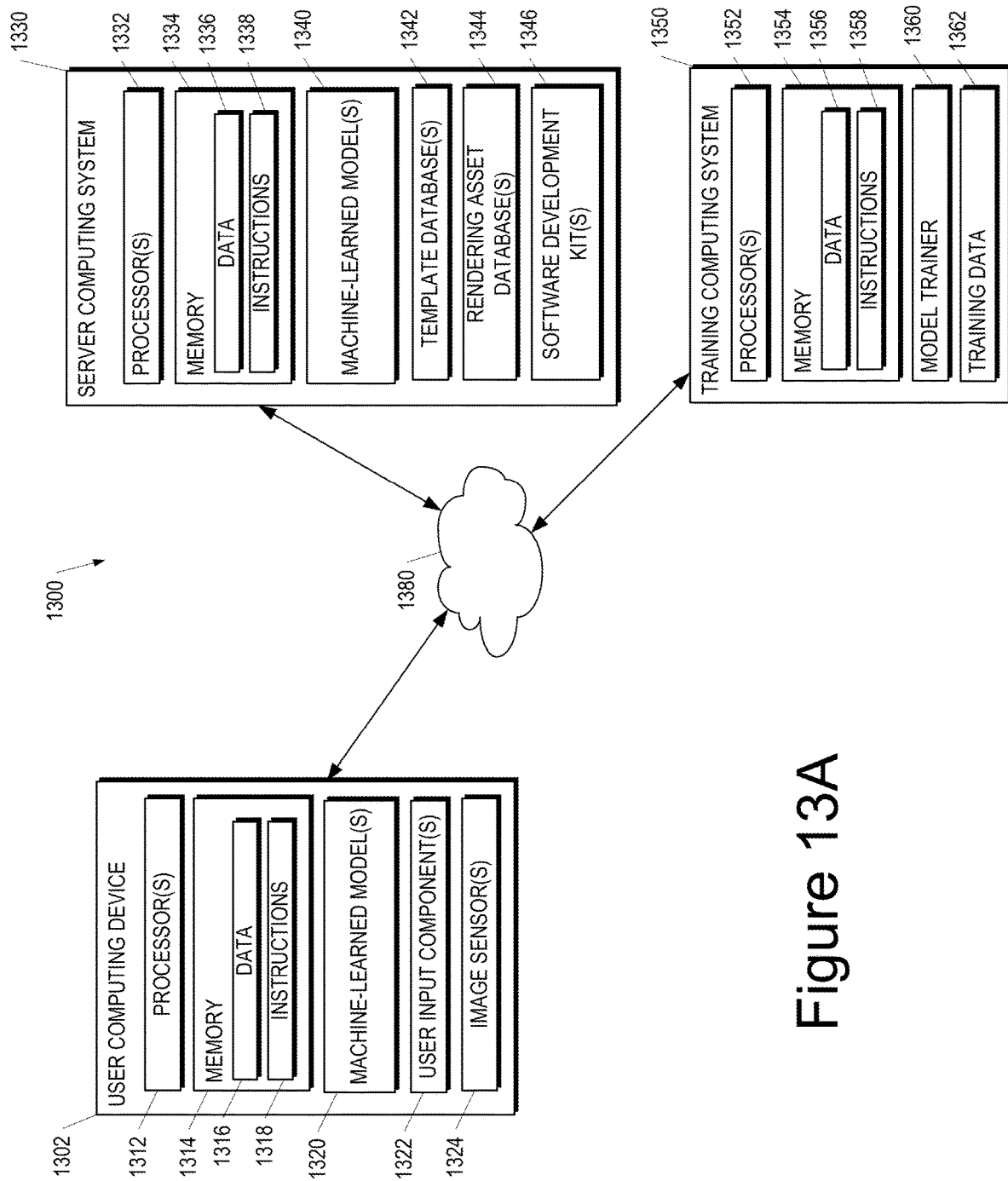
FIG. 13A depicts a block diagram of an example computing system that performs virtual environment generation according to example embodiments of the present disclosure.

FIG. 13A depicts a block diagram of an example computing system 1300 that performs virtual environment generation according to example embodiments of the present disclosure. The system 1300 includes a user computing device 1302, a server computing system 1330, and a training computing system 1350 that are communicatively coupled over a network 1380.

The user computing device 1302 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 1302 includes one or more processors 1312 and a memory 1314. The one or more processors 1312 can be any suitable processing device (e.g., a processor core, a microprocessor, an ASIC, a FPGA, a controller, a microcontroller, etc.) and can be one processor or a plurality of processors that are operatively connected. The memory 1314 can include one or more non-transitory computer-readable storage mediums, such as RAM, ROM, EEPROM, EPROM, flash memory devices, magnetic disks, etc., and combinations thereof. The memory 1314 can store data 1316 and instructions 1318 which are executed by the processor 1312 to cause the user computing device 1302 to perform operations.

In some implementations, the user computing device 1302 can store or include one or more machine learned models 1320 (e.g., one or more neural radiance field models). For example, the machine-learned models 1320 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 1320 are discussed with reference to FIGS. 2-5 & 9-10.

In some implementations, the one or more machine-learned models 1320 can be received from the server computing system 1330 over network 1380, stored in the user computing device memory 1314, and then used or otherwise implemented by the one or more processors 1312. In some implementations, the user computing device 1302 can implement multiple parallel instances of a single machine-learned model 1320 (e.g., to perform parallel view rendering synthesis across multiple instances of view position and/or view direction requests).

More particularly, the one or more machine-learned models 1320 can include one or more neural radiance field models that can be trained to process a position and a view direction and output one or more renderings. The one or more renderings can be descriptive of one or more objects, which can be concatenated with image data to generate a view rendering. Alternatively and/or additionally, the one or more renderings can be descriptive of an environment with the objects. In some implementations, the one or more machine-learned models 1320 can include an object detection model, an object recognition model, and/or a segmentation model. The model(s) can be utilized to generate one or more rendering datasets for rendering an object in a template environment and/or a user environment. For example, one or more images can be obtained. The object detection model can process the one or more images to generate one or more bounding boxes associated with one or more detected objects in the images. The data associated with the one or more bounding boxes can be processed with the object recognition model to generate one or more classifications. Additionally and/or alternatively, the data associated with the one or more bounding boxes can be processed with a segmentation model to generate segmented object data. The segmented object data and the one or more classifications can then be stored to train a neural radiance field model and/or to be utilized to generate augmented image data.

In some implementations, one or more machine-learned models 1320 can include one or more suggestion models to process user data to generate one or more object suggestions and/or template suggestions. Additionally and/or alternatively, the one or more suggestions models can be trained to condition suggestions based on a determined template, an obtained image, and/or one or more other object suggestions.

Additionally or alternatively, one or more machine-learned models 1340 (e.g., one or more neural radiance field models) can be included in or otherwise stored and implemented by the server computing system 1330 that communicates with the user computing device 1302 according to a client-server relationship. For example, the machine-learned models 1340 can be implemented by the server computing system 1340 as a portion of a web service (e.g., a virtual environment generation service). Thus, one or more models 1320 can be stored and implemented at the user computing device 1302 and/or one or more models 1340 can be stored and implemented at the server computing system 1330.

The user computing device 1302 can also include one or more user input component 1322 that receives user input. For example, the user input component 1322 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 1330 includes one or more processors 1332 and a memory 1334. The one or more processors 1332 can be any suitable processing device (e.g., a processor core, a microprocessor, an ASIC, a FPGA, a controller, a microcontroller, etc.) and can be one processor or a plurality of processors that are operatively connected. The memory 1334 can include one or more non-transitory computer-readable storage mediums, such as RAM, ROM, EEPROM, EPROM, flash memory devices, magnetic disks, etc., and combinations thereof. The memory 1334 can store data 1336 and instructions 1338 which are executed by the processor 1332 to cause the server computing system 1330 to perform operations.

In some implementations, the server computing system 1330 includes or is otherwise implemented by one or more server computing devices. In instances in which the server computing system 1330 includes plural server computing devices, such server computing devices can operate according to sequential computing architectures, parallel computing architectures, or some combination thereof.

As described above, the server computing system 1330 can store or otherwise include one or more machine-learned models 1340. For example, the models 1340 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 1340 are discussed with reference to FIGS. 2-5 & 9-10.

The user computing device 1302 and/or the server computing system 1330 can train the models 1320 and/or 1340 via interaction with the training computing system 1350 that is communicatively coupled over the network 1380. The training computing system 1350 can be separate from the server computing system 1330 or can be a portion of the server computing system 1330.

The training computing system 1350 includes one or more processors 1352 and a memory 1354. The one or more processors 1352 can be any suitable processing device (e.g., a processor core, a microprocessor, an ASIC, a FPGA, a controller, a microcontroller, etc.) and can be one processor or a plurality of processors that are operatively connected. The memory 1354 can include one or more non-transitory computer-readable storage mediums, such as RAM, ROM, EEPROM, EPROM, flash memory devices, magnetic disks, etc., and combinations thereof. The memory 1354 can store data 11356 and instructions 1358 which are executed by the processor 1352 to cause the training computing system 1350 to perform operations. In some implementations, the training computing system 1350 includes or is otherwise implemented by one or more server computing devices.

The training computing system 1350 can include a model trainer 1360 that trains the machine-learned models 1320 and/or 1340 stored at the user computing device 1302 and/or the server computing system 1330 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 1360 can perform a number of generalization techniques (e.g., weight decays, dropouts, etc.) to improve the generalization capability of the models being trained.

In particular, the model trainer 1360 can train the machine-learned models 1320 and/or 1340 based on a set of training data 1362. The training data 1362 can include, for example, training image data, training text data, training latent encoding data, training label data, training augmentation data, training segmentation mask data, training bounding boxes, training statistical predictions, and/or other training data. In some implementations, the training data 1362 can include ground truth data.

In some implementations, if the user has provided consent, the training examples can be provided by the user computing device 1302. Thus, in such implementations, the model 1320 provided to the user computing device 1302 can be trained by the training computing system 1350 on user-specific data received from the user computing device 1302. In some instances, this process can be referred to as personalizing the model.

The model trainer 1360 includes computer logic utilized to provide desired functionality. The model trainer 1360 can be implemented in hardware, firmware, and/or software controlling a general purpose processor. For example, in some implementations, the model trainer 1360 includes program files stored on a storage device, loaded into a memory and executed by one or more processors. In other implementations, the model trainer 1360 includes one or more sets of computer-executable instructions that are stored in a tangible computer-readable storage medium such as RAM hard disk or optical or magnetic media.

The network 1380 can be any type of communications network, such as a local area network (e.g., intranet), wide area network (e.g., Internet), or some combination thereof and can include any number of wired or wireless links. In general, communication over the network 1380 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s)

can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data (e.g., a user request provided via an audio input). The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data (e.g., statistical photon signal data, trending data, time logs, etc.). The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 13A illustrates one example computing system that can be used to implement the present disclosure. Other computing systems can be used as well. For example, in some implementations, the user computing device 1302 can include the model trainer 1360 and the training dataset 1362. In such implementations, the models 1320 can be both trained and used locally at the user computing device 1302. In some of such implementations, the user computing device 1302 can implement the model trainer 1360 to personalize the models 1320 based on user-specific data.

Additionally and/or alternatively, the user computing device 1302 can include one or more user input components 1322. The one or more user input components 1322 can be utilized to obtain and/or generate one or more user inputs that can then be processed by one or more blocks to generate one or more outputs. The one or more user input components 1322 can include and/or be associated with a keyboard, a mouse, a touch display, a microphone, one or more conductive sensors, one or more physical sensors, and/or one or more infrared sensors.

The user computing device 1302 can include one or more image sensors 1324 that can be utilized to capture one or more images of a user environment. The one or more captured images can be processed to generate one or more representations of the user environment. Alternatively and/or additionally, the one or more captured images can be utilized to generate one or more rendering datasets. For example, the one or more captured images can be utilized to train one or more neural radiance field models.

Additionally and/or alternatively, the server computing system 1330 can store and/or include one or more template databases 1342, one or more rendering databases 1344, and/or one or more software development kits 1346. The one or more template databases 1342 can store a plurality of template images, machine-learned models, representations, and/or other datasets associated with a plurality of template environments. The one or more rendering databases 1344 can store a plurality of rendering datasets associated with a plurality of objects associated with a plurality of different object types, a plurality of different price ranges, and/or a plurality of different sizes. The one or more template databases 1342 and/or the one or more rendering databases 1344 may be searchable to obtain one or more specific datasets upon receiving one or more queries.

The one or more software development kits 1346 can be transmitted to one or more computing systems to enable one or more third parties and/or one or more users to generate rendering datasets to be utilized by the systems and methods disclosed herein.

Figure 13B:
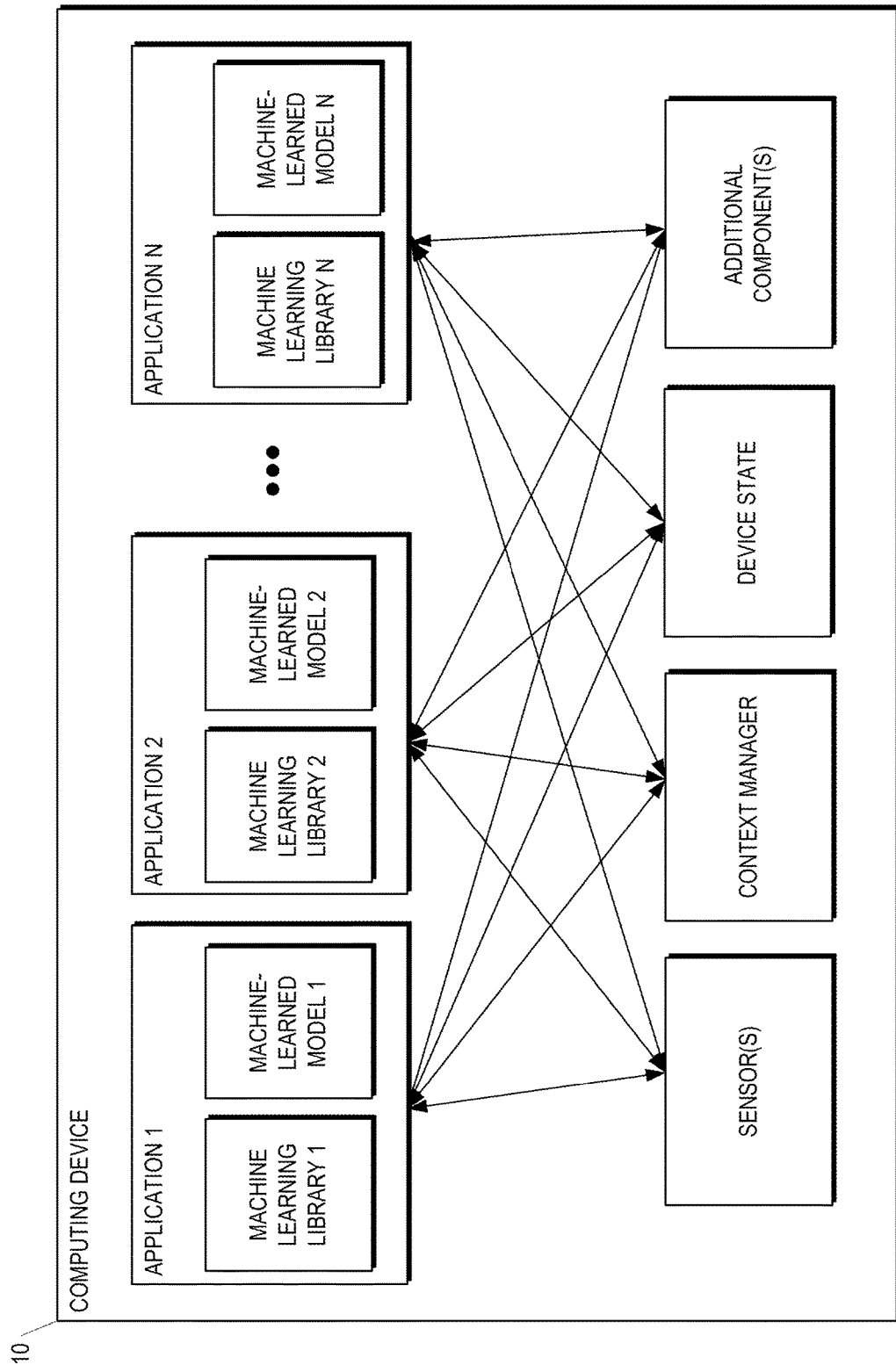
FIG. 13B depicts a block diagram of an example computing device that performs virtual environment generation according to example embodiments of the present disclosure.

FIG. 13B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 13B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 13C:
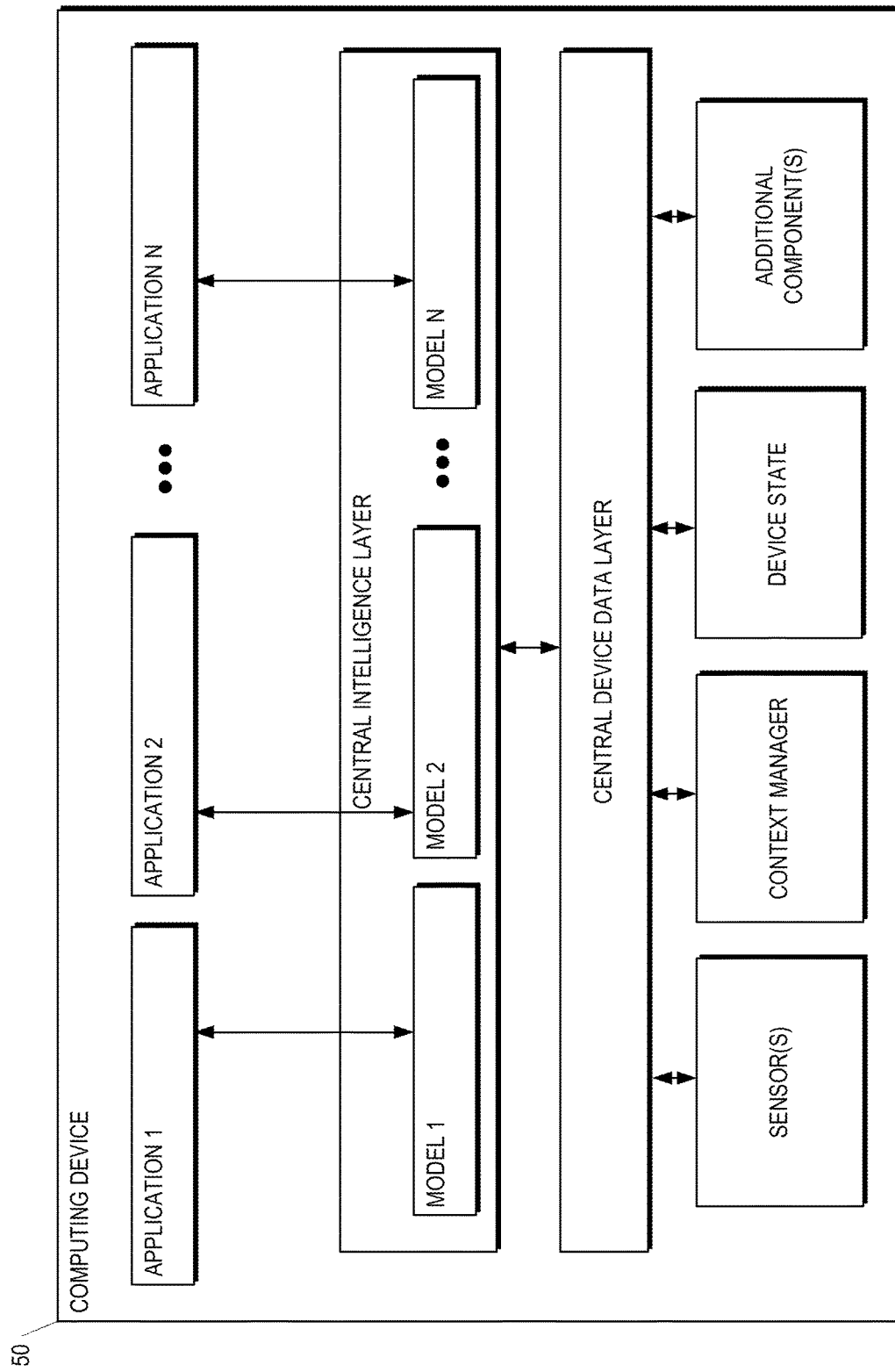
FIG. 13C depicts a block diagram of an example computing device that performs virtual environment generation according to example embodiments of the present disclosure.

FIG. 13C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 13C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 13C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 14:
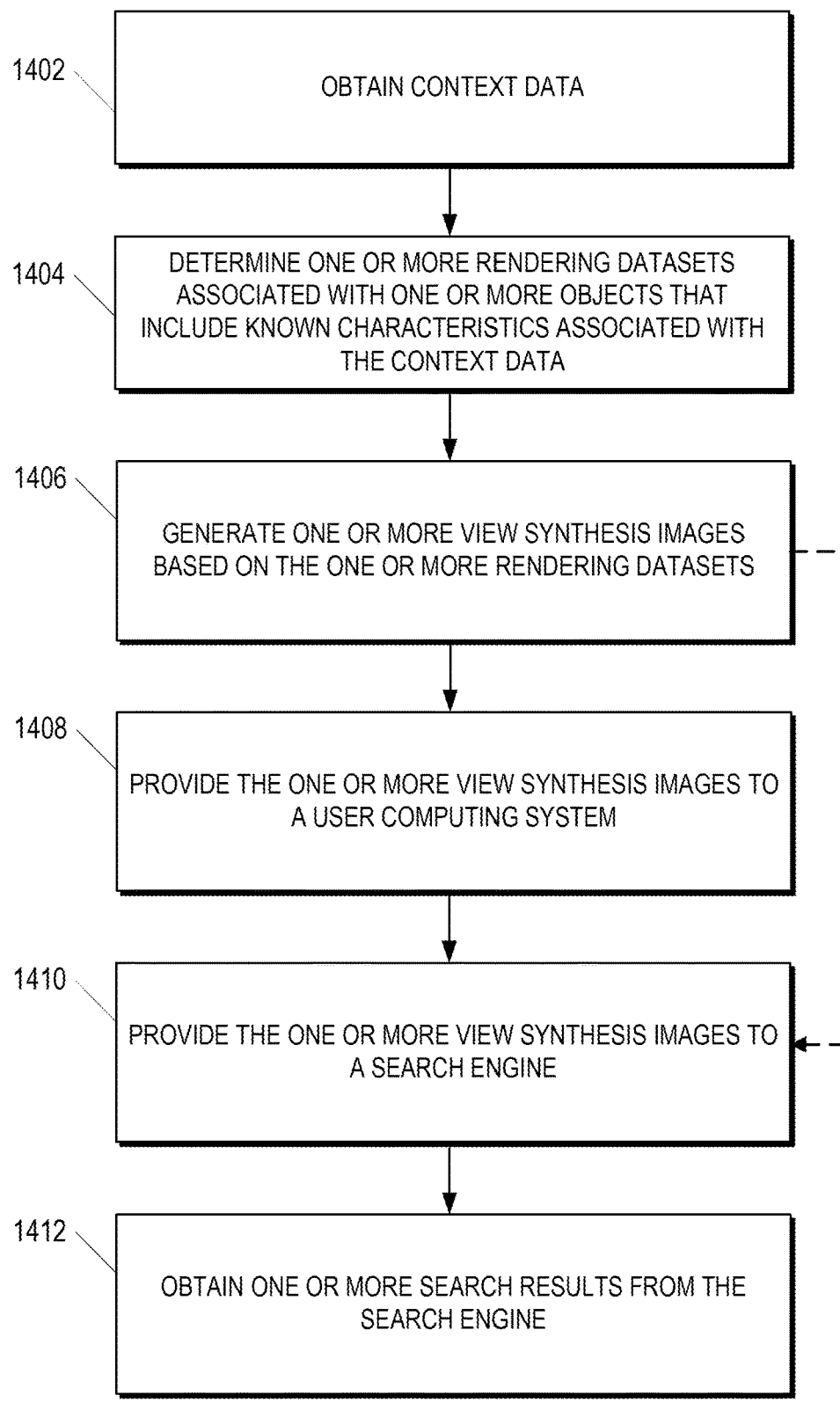
FIG. 14 depicts a flow chart diagram of an example method to perform context based rendering dataset selection according to example embodiments of the present disclosure.

FIG. 14 depicts a flow chart diagram of an example method to perform according to example embodiments of the present disclosure. Although FIG. 14 depicts steps performed in a particular order for purposes of illustration and discussion, the methods of the present disclosure are not limited to the particularly illustrated order or arrangement. The various steps of the method 1400 can be omitted, rearranged, combined, and/or adapted in various ways without deviating from the scope of the present disclosure.

At 1402, a computing system can obtain context data. The context data can be obtained from a user computing system associated with a particular user. The context data can be associated with one or more contexts that may be utilized to determine an object availability to a user, which can include a user location, shipping options available to a user, a user budget (e.g., price range), size constraints (e.g., size available in a room and/or size of passage for delivering the object to a desired location), and/or one or more other contexts. The context data can include one or more preferences, historical data (e.g., a user search history, a user browsing history, and/or a user purchase history), and/or user profile data. The context data may include data descriptive of a preferred style and/or a preferred aesthetic.

At 1404, the computing system can determine one or more rendering datasets associated with one or more objects that include known characteristics associated with the context data. In particular, the computing system can determine one or more objects that are available to be accessed to the user based on a user location and/or a user shipping options. Additionally and/or alternatively, the determination may be based on a price of the object and/or based on whether the object is provided for purchase (e.g., objects that are out of the price range and/or are discontinued may not be determined to include the known characteristics). In some implementations, the one or more rendering datasets may be selected based on the one or more objects being associated with a style and/or an aesthetic determined to be preferred by the user (e.g., determined based on historical data and/or preference data).

At 1406, the computing system can generate one or more view synthesis images based on the one or more rendering datasets. The one or more view synthesis images can include one or more renderings of the object in isolation and/or in an environment. In some implementations, the one or more view synthesis images can be descriptive of the object in a user environment (e.g., in an image provided by the user (e.g., a live feed from a user camera)) and/or a template environment.

At 1408, the computing system can provide the one or more view synthesis images to a user computing system. The one or more view synthesis images can be provided via a user interface. The user interface may include a viewfinder interface that renders the object as an augmented reality asset. In some implementations, the one or more view synthesis images may be provided in a carousel interface.

At 1410, the computing system can provide the one or more view synthesis images to a search engine. The one or more view synthesis images may be provided to the search engine upon generation and/or may be provided to the search engine in response to one or more user inputs (e.g., a user selection). The search engine may be associated with one or more databases. In some implementations, the search engine may be provided with the context data and/or metadata associated with the rendering dataset.

At 1412, the computing system can obtain one or more search results from the search engine. The one or more search results may be determined based on one or more visual search techniques. The one or more search results may be descriptive of links, images, and/or details associated with the object of the rendering dataset. The one or more search results may include one or more action user interface elements for acquiring the object.

In some implementations, the one or more rendering datasets may include one or more rendering datasets generated by one or more other users (e.g., peer users, retailers, object manufacturers, etc.). The generated rendering datasets can then be utilized for rendering based on request data associated with a first party user and/or a third party user.

Figure 15:
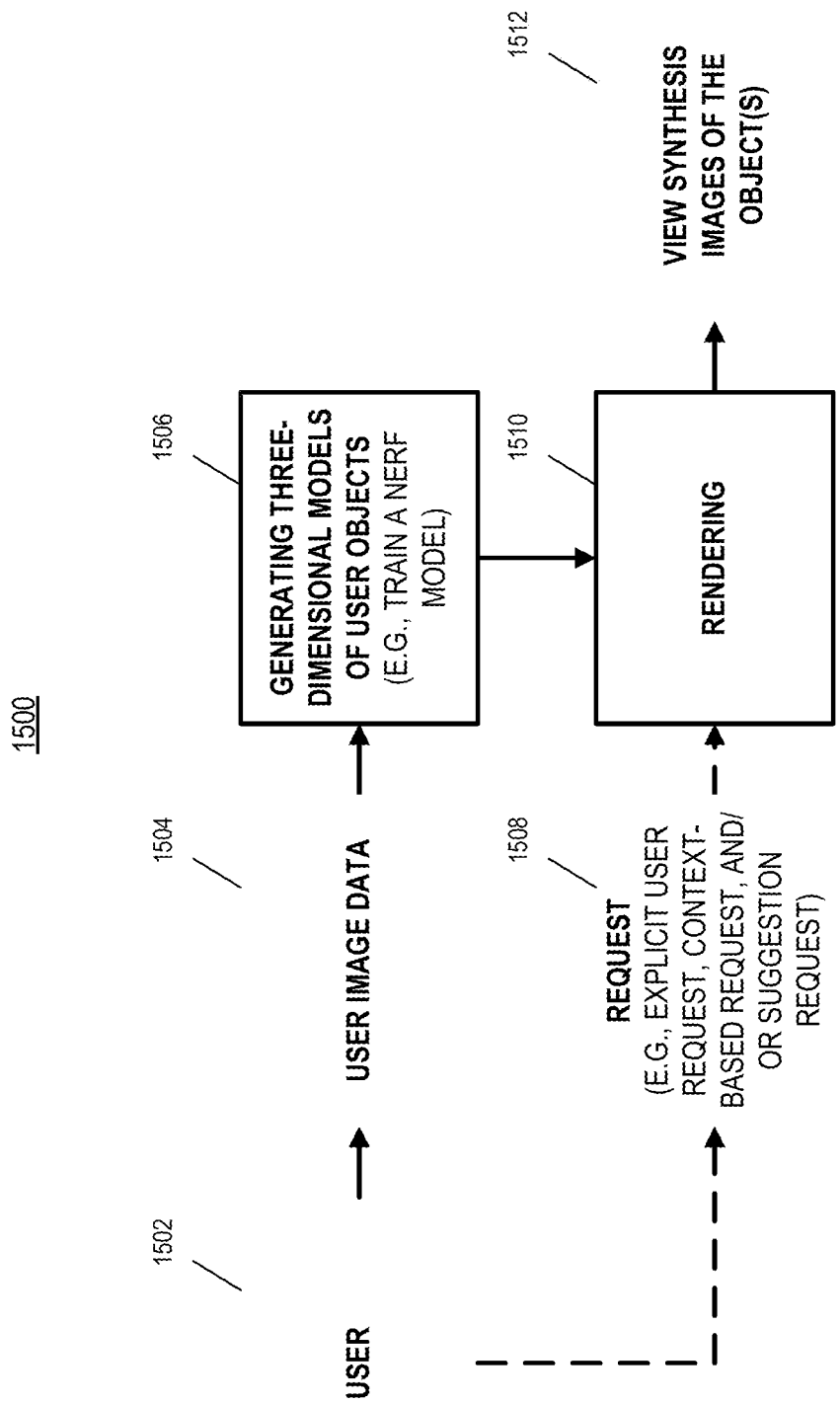
FIG. 15 depicts a block diagram of an example view synthesis image generation system according to example embodiments of the present disclosure.

FIG. 15 depicts a block diagram of an example view synthesis image generation system 1500 according to example embodiments of the present disclosure. In particular, the view synthesis image generation system 1500 can obtain user image data 1504 and/or request data 1508 from a user 1502 (e.g., from a user computing system). The user image data 1504 and/or the request data 1508 can be obtained in response to a time event, one or more user inputs, an application download and profile setup, and/or a trigger event determination. The user image data 1504 and/or the request data 1508 may be obtained via one or more interactions with a platform (e.g., a web platform). In some implementations, an application programming interface associated with a platform can obtain and/or generate the user image data 1504 and/or the request data 1508 in response to one or more inputs. The user 1502 can be an individual, a retailer, a manufacturer, a service provider, and/or another entity.

The user image data 1504 can be utilized to generate three-dimensional models of user objects 16 depicted in the user image data 1506. Generating the three-dimensional models 1506 can include learning a three-dimensional representation of the respective objects by training one or more neural radiance field models on the user image data 1504.

A rendering block 1510 can process the request data 1508 and can utilize the generated three-dimensional models to render one or more view synthesis images of the object(s) 1512. The request data 1508 can be descriptive of an explicit user request to generate a view synthesis rendering in a user's environment (e.g., an augmented-reality rendering) and/or a user request to render the one or more objects in combination with one or more additional objects or features. The request data 1508 may be descriptive of a context and/or parameters that may affect how the object is rendered (e.g., lighting, size of environmental objects, time of day, position and direction of other objects in the environment, and/or other contexts associated with the generation). The request data 1508 may be generated and/or obtained in response to a context of the user.

The view synthesis images of the objects 1512 can be provided via a view finder, a static image, a catalog user interface, and/or via a virtual reality experience. The generated view synthesis images 1512 may be stored locally and/or on a server in association with a user profile. In some implementations, the view synthesis images of the objects 1512 can be stored by a platform via one or more server computing systems associated with the platform. Additionally and/or alternatively, the view synthesis images of the objects 1512 may be provided for display and/or interacted with via a user interface associated with the platform. A user may add the view synthesis images of the objects 1512 to one or more collections associated with the user, which may then be viewed as a collective via a collections user interface.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for providing an augmented-reality preview, the method comprising:
  obtaining, by a computing system comprising one or more processors, user data and image data, wherein the user data is associated with a particular user, wherein the image data is descriptive of a user environment, wherein the user data comprises context data descriptive of context information associated with the particular user, wherein the context information comprises size constraints, accessibility constraints, and a user location;

determining, by the computing system, one or more rendering datasets to obtain based on the context information, wherein the one or more rendering datasets are determined based at least in part on known characteristics for a respective product associated with the one or more rendering datasets, wherein the respective product is determined to be available to the particular user based on one or more availability criterion, wherein the one or more availability criterion are determined based on the context information associated with the particular user and the known characteristics, wherein the one or more rendering datasets are determined based on determining the respective product is available to the particular user based on the known characteristics for the respective product, the size constraints, the accessibility constraints, and the user location, wherein the one or more rendering datasets are associated with one or more machine-learned three-dimensional representations;

processing, by the computing system, the image data with the one or more rendering datasets to generate augmented image data, wherein the augmented image data is descriptive of the respective product in the user environment; and providing, by the computing system, the augmented image data for display via an interactive user interface, wherein the interactive user interface is configured to provide a plurality of different views of the respective product in the user environment.

2. The method of claim 1, wherein the one or more rendering datasets is obtained from a rendering dataset library comprising a plurality of rendering datasets, wherein each rendering dataset comprises one or more neural radiance field models with one or more learned parameters associated with a respective machine-learned three-dimensional representation.

3. The method of claim 1, further comprising:
receiving, by the computing system, a selection of at least a portion of the augmented image data, wherein the portion is associated with a particular object in the augmented image data;
obtaining, by the computing system, one or more search results associated with the particular object based on the selection; and
providing, by the computing system, the one or more search results for display.

4. The method of claim 1, further comprising:
obtaining a user input data associated with a particular rendering associated with the respective product rendered into the image data; and
adjusting the augmented image data to replace the particular rendering with a different rendering, wherein the different rendering is associated with a different product that differs from the respective product.

5. The method of claim 1, further comprising:
obtaining, by the computing system, one or more search result based on a knowledge graph associated with the one or more rendering datasets; and
providing, by the computing system, the one or more search results for display.

6. The method of claim 1, wherein the one or more rendering datasets were generated by one or more third parties.

7. The method of claim 1, wherein the one or more rendering datasets comprise one or more neural radiance field models.

8. The method of claim 7, wherein the one or more neural radiance field models were trained by:
obtaining, by the computing system, training data, wherein the training data comprises a training image, a respective training position, and a respective training view direction, wherein the respective training position and the respective training view direction are associated with the training image;
processing, by the computing system, the respective training position and the respective training view direction with one or more neural radiance field models to generate a view rendering;
evaluating, by the computing system, a loss function that evaluates a difference between the view rendering and the training image; and
adjusting, by the computing system, one or more parameters of the one or more neural radiance field models based at least in part on the loss function.

9. The method of claim 8, wherein the view rendering comprises a plurality of predicted color values and a plurality of predicted density values.

10. The method of claim 8, wherein the loss function comprises an L2 loss and a photometric loss.

11. A computing system for providing an augmented-reality preview, the system comprising:
one or more processors; and
one or more non-transitory computer-readable media that collectively store instructions that, when executed by the one or more processors, cause the computing system to perform operations, the operations comprising:
obtaining user data and image data, wherein the user data is associated with a particular user, wherein the image data is descriptive of a user environment, wherein the user data comprises context data descriptive of context information associated with the particular user, wherein the context information comprises size constraints, accessibility constraints, and a user location, wherein the accessibility constraints are associated with shipping options available to the particular user,
determining one or more rendering datasets to obtain based on the context information, wherein the one or more rendering datasets are determined based at least in part on known characteristics for a respective product associated with the one or more rendering datasets, wherein the respective product is determined to be available to the particular user based on one or more availability criterion, wherein the one or more availability criterion are determined based on the context information associated with the particular user and the known characteristics, wherein the one or more rendering datasets are determined based on determining the respective product is available to the particular user based on the known characteristics for the respective product, the size constraints, the accessibility constraints, and the user location, wherein the one or more rendering datasets are associated with one or more machine-learned three-dimensional representations;
processing the image data with the one or more rendering datasets to generate augmented image data, wherein the augmented image data is descriptive of the respective product in the user environment; and providing the augmented image data for display via an interactive user interface, wherein the interactive user interface is configured to provide a plurality of different views of the respective product in the user environment.

12. The system of claim 11, wherein the operations further comprise:

obtaining a navigation user input; and in response to obtaining the navigation user input, generating a different view of the respective product in the user environment from a different position within the user environment.

13. The system of claim 11, wherein the operations further comprise:

obtaining a customization user input; and in response to obtaining the customization user input, determining one or more additional rendering datasets to obtain based on the context information and the customization user input;

processing the image data with the one or more additional rendering datasets to generate additional augmented image data, wherein the additional augmented image data is descriptive of the second respective product in the user environment.

14. The system of claim 13, wherein the one or more additional rendering datasets are determined based at least in part on known characteristics for a second respective product associated with the one or more additional rendering datasets.

15. The system of claim 13, wherein the operations further comprise:

providing the additional augmented image data for display via the interactive user interface.

16. The system of claim 13, wherein the additional augmented image data is descriptive of the respective product and the second respective product in the user environment.

17. One or more non-transitory computer-readable media that collectively store instructions that, when executed by one or more computing devices, cause the one or more computing devices to perform operations, the operations comprising:

obtaining user data and image data, wherein the user data is associated with a particular user, wherein the image data is descriptive of a user environment, wherein the user data comprises context data descriptive of context information associated with the particular user, wherein the context information comprises size constraints, accessibility constraints, and a user location, wherein the size constraints are descriptive of at least one of a size available in a room of the particular user or a size of a passage for delivering the object to the room;

determining one or more rendering datasets to obtain based on the context information, wherein the one or more rendering datasets are determined based at least in part on known characteristics for a respective product associated with the one or more rendering datasets, wherein the respective product is determined to be available to the particular user based on one or more availability criterion, wherein the one or more availability criterion are determined based on the context information associated with the particular user and the known characteristics, wherein the one or more rendering datasets are determined based on determining the respective product is available to the particular user based on the known characteristics for the respective product, the size constraints, the accessibility constraints, and the user location, wherein the one or more rendering datasets are associated with one or more machine-learned three-dimensional representations;

processing the image data with the one or more rendering datasets to generate augmented image data, wherein the augmented image data is descriptive of the respective product in the user environment; and providing the augmented image data for display via an interactive user interface, wherein the interactive user interface is configured to provide a plurality of different views of the respective product in the user environment.

18. The one or more non-transitory computer-readable media of claim 17, wherein the user data comprises a search query, wherein the search query comprises one or more query images, and wherein determining the plurality of objects associated with the user data comprises:

processing the one or more query images to determine one or more depicted objects;

querying the rendering asset database based on the one or more depicted objects; and determining one or more rendering datasets in a rendering asset database are associated with at least a portion of the search query.

19. The one or more non-transitory computer-readable media of claim 18, wherein providing the virtual environment for display in the interactive user interface further comprises:

obtaining user interface input, wherein the user interface input comprises a navigation interaction with the interactive user interface;

generating a second view rendering based on one or more of the plurality of rendering datasets, wherein the second view rendering comprises a second image descriptive of at least a second portion of the virtual environment from a second position and a second direction; and providing the second view rendering for display.

20. The one or more non-transitory computer-readable media of claim 17, wherein providing the virtual environment for display in the interactive user interface comprises:

generating a first view rendering based on one or more of the plurality of rendering datasets, wherein the first view rendering comprises a first image descriptive of at least a first portion of the virtual environment from a first position and a first direction; and providing the first view rendering for display.

* * * * *